US007139305B2

(12) United States Patent
Gavnoudias et al.

(10) Patent No.: US 7,139,305 B2
(45) Date of Patent: Nov. 21, 2006

(54) CONFIGURABLE TERMINAL ENGINE

(75) Inventors: Stratis Gavnoudias, Bellmore, NY (US); Joseph Boccuzzi, Staten Island, NY (US); Alexander Jacques, Kings Park, NY (US); Raj M. Misra, Fremont, CA (US); Yan Zhang, Pennington, NJ (US); Avi Silverberg, Commack, NY (US); Richard Rizza, Bellmore, NY (US); Yosef Nacson, Plainview, NY (US)

(73) Assignee: Infineon Technologies AG, Munich (DE)

( * ) Notice: Subject to any disclaimer, the term of this patent is extended or adjusted under 35 U.S.C. 154(b) by 692 days.

(21) Appl. No.: 10/212,190

(22) Filed: Aug. 2, 2002
(Under 37 CFR 1.47)

(65) Prior Publication Data
US 2003/0138030 A1 Jul. 24, 2003

Related U.S. Application Data

(60) Provisional application No. 60/310,193, filed on Aug. 2, 2001.

(51) Int. Cl.
*H04B 1/69* (2006.01)
(52) U.S. Cl. .................. 375/147; 375/148; 375/152
(58) Field of Classification Search ............ 375/148, 375/219, 130, 140, 143, 144, 147, 152; 455/73; 370/335, 342, 441
See application file for complete search history.

(56) References Cited

U.S. PATENT DOCUMENTS

| | | | |
|---|---|---|---|
| 5,663,733 A * | 9/1997 | Lennen ................... 342/357.12 |
| 6,052,701 A * | 4/2000 | Koslov et al. .............. 708/313 |
| 6,275,545 B1 | 8/2001 | Suzuki | |
| 6,324,210 B1 * | 11/2001 | Yang et al. .................. 375/152 |
| 6,333,926 B1 | 12/2001 | Van Heeswyk et al. | |
| 6,370,130 B1 | 4/2002 | Zhou et al. | |
| 6,373,882 B1 * | 4/2002 | Atarius et al. .............. 375/148 |
| 6,507,605 B1 * | 1/2003 | Fukumoto et al. .......... 375/152 |
| 6,904,076 B1 * | 6/2005 | Tsutsui et al. .............. 375/130 |
| 2002/0015425 A1 * | 2/2002 | Fujii ........................... 370/535 |
| 2002/0015438 A1 * | 2/2002 | Ishizu et al. ................. 375/147 |
| 2002/0037030 A1 | 3/2002 | Goto | |
| 2002/0037737 A1 * | 3/2002 | Learned et al. ............. 455/526 |
| 2002/0097779 A1 * | 7/2002 | Bang et al. .................. 375/144 |
| 2002/0114288 A1 | 8/2002 | Soliman | |
| 2002/0141487 A1 * | 10/2002 | Bradley ....................... 375/148 |

(Continued)

FOREIGN PATENT DOCUMENTS

WO    WO-98/52365 A2    11/1998

(Continued)

*Primary Examiner*—Tesfaldet Bocure
(74) *Attorney, Agent, or Firm*—Dickstein, Shapiro, LLP.

(57) ABSTRACT

A configurable cellular terminal engine (CTE) in accordance with an exemplary embodiment of this invention is configurable by an external agent (e.g., microcontroller, DSP, or state machine) to suit the particular requirements of different spread spectrum systems. In an exemplary embodiment, the CTE comprises on a chipset a modem unit and a channel codec unit. The modem unit has a front end unit for coupling to an antenna; a matched filter searchers unit coupled at least to the front end unit; a searchers unit coupled to at least the front end unit; a finger processing unit coupled to the front end unit; a parameter estimation processor unit coupled to at least the finger processing unit and the searchers unit; and a transmitter unit. The channel codec unit has a channel decoder unit coupled at least to the finger processing unit; and a channel encoder coupled at least to the transmitter unit.

19 Claims, 24 Drawing Sheets

U.S. PATENT DOCUMENTS

2003/0072390 A1* 4/2003 Corbaton et al. .......... 375/316

FOREIGN PATENT DOCUMENTS

| WO | WO-01/47135 A1 | 6/2001 |
| WO | WO-01/50147 A1 | 7/2001 |
| WO | WO-01/50616 A1 | 7/2001 |
| WO | WO-01/50646 A1 | 7/2001 |

* cited by examiner

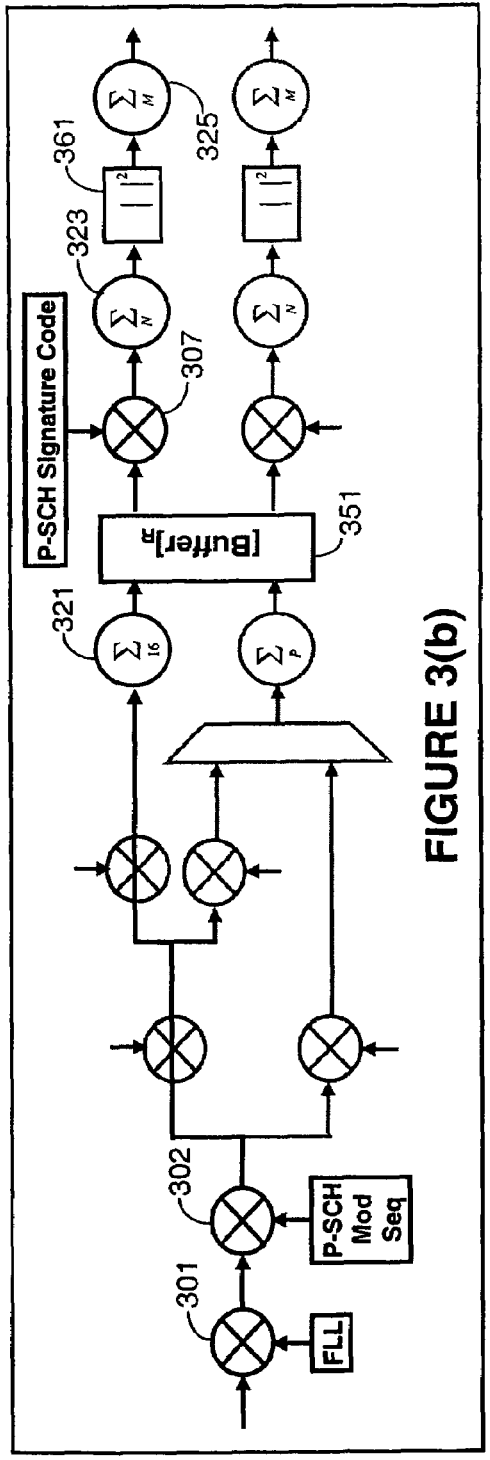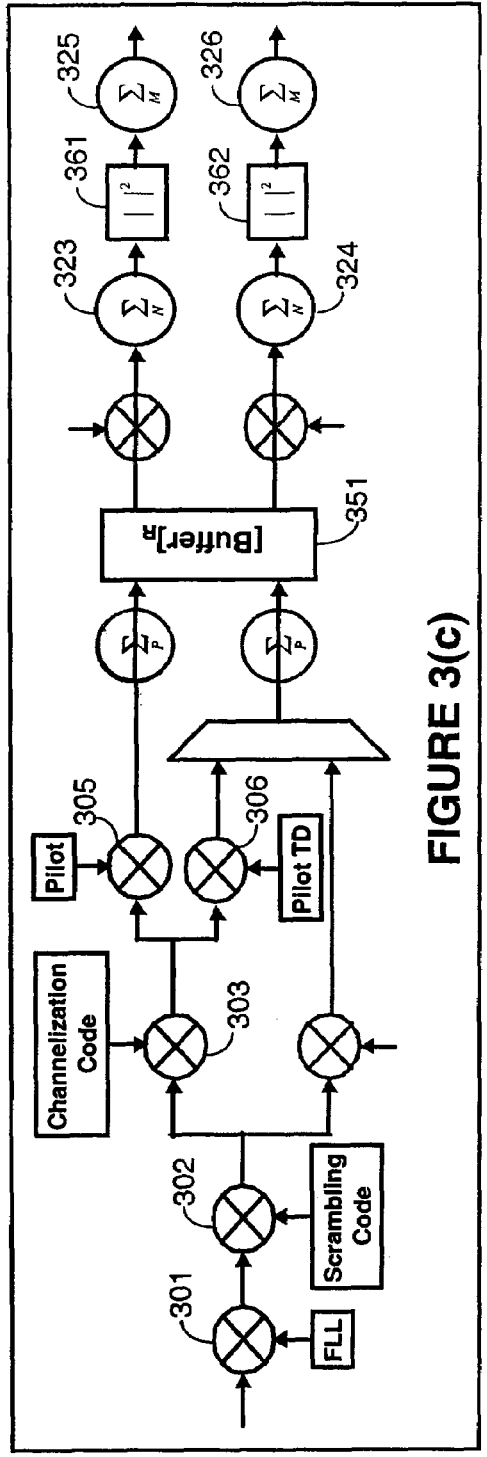
FIGURE 3(b)
FIGURE 3(c)

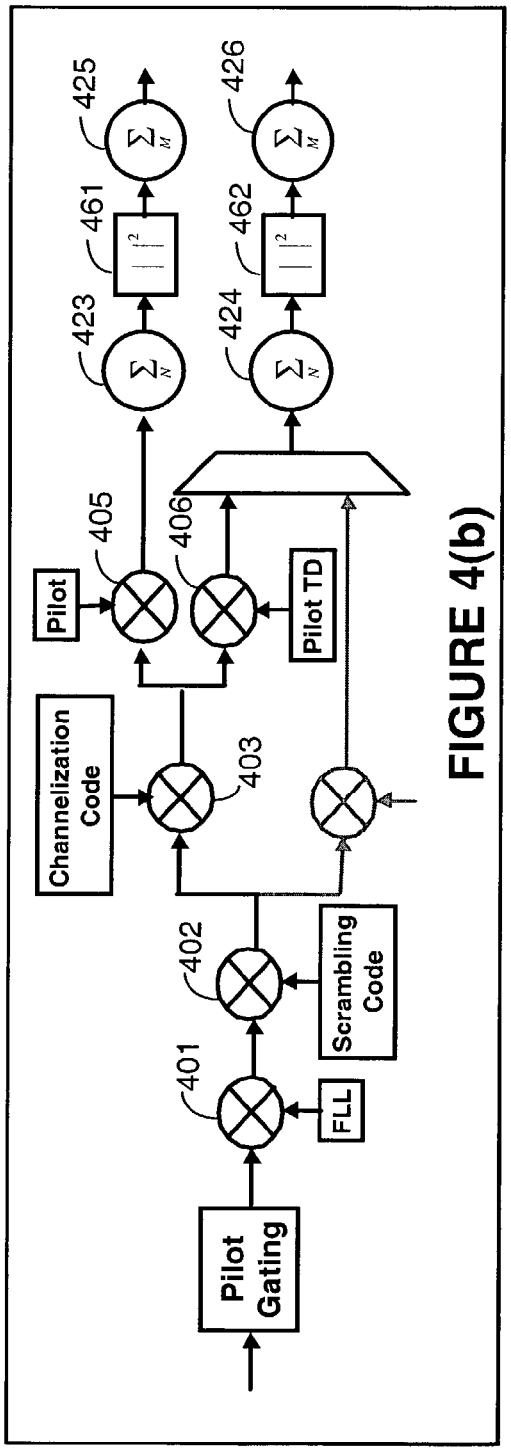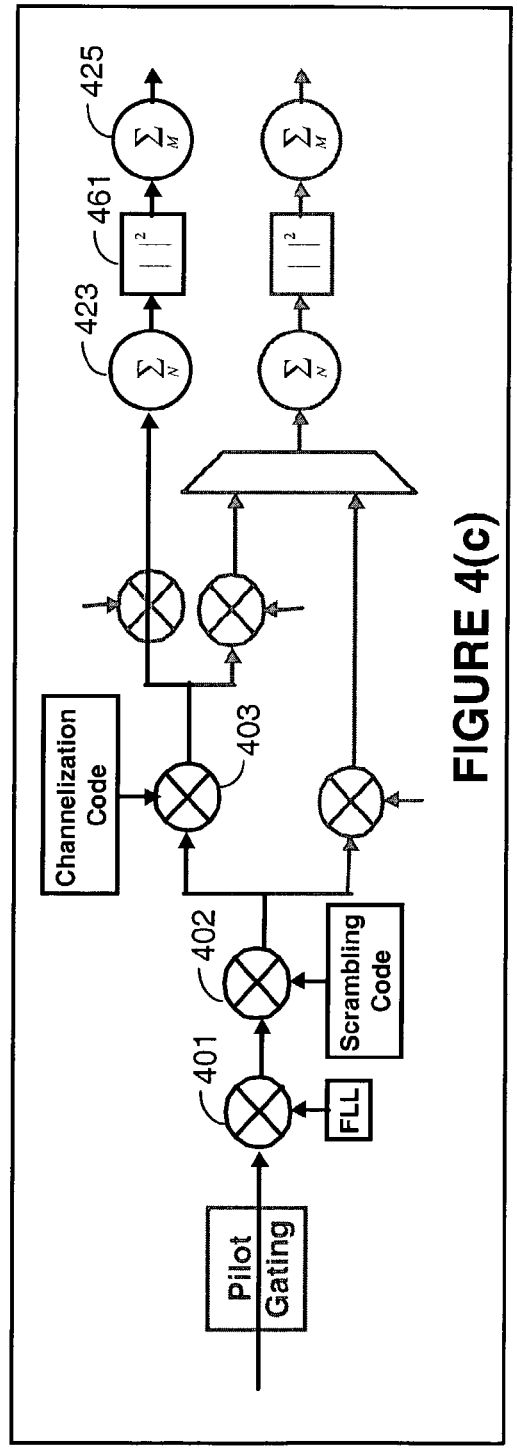

CONFIGURABLE TERMINAL ENGINE

PRIORITY DATA

This application claims priority from the following Provisional Application:

"Configurable Terminal Engine," bearing U.S. Ser. No. 60/310,193, filed on Aug. 2, 2001.

CROSS REFERENCE TO RELATED APPLICATIONS

Related applications are:

"Apparatus and Method for Configurable Multi-dwell Search Engine for Spread Spectrum Applications", Ser. No. 09/919,700, filed Jul. 31, 2001 now issued as U.S. Pat. No. 7,003,015 on Feb. 21, 2006;

"Method and Apparatus for Time-sliced and Multi-threaded Data Processing in a Communication System", Ser. No. 09/920,093, filed Jul. 31, 2001;

"Apparatus and Methods for Sample Selection and Reuse of Rake Fingers in Spread Spectrum Systems", Ser. No. 09/920,095, filed Jul. 31, 2001;

"Distributed Micro Instruction Set Processor Architecture for High-efficiency Signal Processing", Ser. No. 09/912,721, filed Jul. 24, 2001; and "Virtual Machine Interface for Hardware Reconfigurable and Software Programmable Processors", Ser. No. 09/828,381, filed Apr. 5, 2001.

Each of these applications is incorporated herein by reference.

BACKGROUND OF THE INVENTION

This invention relates generally to wireless communication systems. The present invention also relates to integrated circuits (ICs) for basestations and Semiconductor Intellectual Property (SIP) Cores for handset and terminal products. In addition, this invention relates to communications theory, digital signal processing, computer architectures, and silicon engineering to efficiently deliver the highest levels of signal processing performance, as well as flexibility and scalability, for next-generation wireless applications.

Wireless communication has extensive applications in consumer and business markets. Among the many communication applications/systems are: mobile wireless, fixed wireless, unlicensed Federal Communications Commission (FCC) wireless, local area network (LAN), cordless telephony, personal base station, telemetry, encryption, and others. Generally, each of these applications utilizes unique and incompatible modulation techniques and protocols. Consequently, each application may require unique hardware, software, and methodologies for processing digital signals, such as generating the codes required for encoding and for decoding a signal, modulation, demodulation, and other processes. This practice can be costly in terms of design, testing, manufacturing, and infrastructure resources. As a result, a need arises to overcome the limitations associated with the varied hardware, software, and methodologies of processing digital signals in each of the varied applications.

In practice, multiple copies of the same signal are typically received at a communications device. These copies, which are sometimes called multipath components arise because the signals take different paths of different length from the transmitter antenna to the receiver antenna. In the case of a code division multiple access (CDMA) system, it is feasible and advantageous to despread and decode several of the multipath components, realign them so that they are also in phase and combine them to produce a stronger signal. To do this, the base band processor in a CDMA system typically takes the form of a rake receiver that has several fingers, each one of which is a receiver that despreads and decodes one of the multipath components. General information about CDMA systems can be found in J. S. Lee, L. E. Miller, CDMA Systems Engineering Handbook (Artech House 1998); J. B. Groe, L. E. Larson, CDMA Mobile Radio Design (Artech House 2000); and V. K. Gorg, IS-95 CDMA and cdma 2000 (Prentice Hall 2000) all of which are incorporated herein by reference.

Typically, a wireless communication device is organized into two parts, a modem and a codec. These are implemented in an application specific integrated circuit (ASIC) in combination with a digital signal processor (DSP). The ASIC offers the advantage of drawing low power but is inflexible. On the other hand, the DSP provides greater flexibility since it is programmable but it does not offer the low power advantage of the ASIC. It is desirable to obtain the low power benefits throughout the communication device while also obtaining the ability to program it.

Service providers and network operators often need to support multiple standards. Therefore, it is desirable to provide a flexible and programmable communication device suitable for different spread spectrum systems at a minimal development cost.

SUMMARY OF THE INVENTION

The present invention is directed to an apparatus comprising a modem unit and a channel codec unit, the modem unit having: a front end unit for coupling to a signal source such as an antenna; a matched filter searchers unit coupled at least to the front end unit; a searchers unit coupled to at least the front end unit; a finger processing unit coupled to the front end unit; a parameter estimation processor unit coupled to at least the finger processing unit and the searchers unit; and a transmitter unit; the channel codec unit having: a channel decoder unit coupled at least to the finger processing unit; and a channel encoder coupled at least to the transmitter unit. We refer to this apparatus as a Configurable Terminal Engine (CTE).

In a preferred embodiment of the invention, the matched filter searchers unit is configured to provide time slot synchronization; and the searchers unit is configured to provide frame synchronization and identification of code groups and identification of codes In another preferred embodiment of the invention, the finger processing unit comprises a pilot finger unit and a data finger unit.

Preferably the matched filter searchers unit comprises: a first multiplier, having first and second inputs and an output; second and third multipliers, each having first and second inputs and an output, the first input of the second and third multipliers being connected to the output of the first multiplier; fourth and fifth multipliers, each having first and second inputs and an output, the first input of the fourth and fifth multipliers being connected to the output of the second multiplier; a multiplexer having two inputs and one output, one input being connected to the output of the fifth multiplier and the other input being connected to the output of the third multiplier; first and second integrators, each having an input and an output, the input of the first integrator being connected to the output of the fourth multiplier and the input of the second integrator being connected to the output of the multiplexer.

Also the apparatus preferably comprises a sixth multiplier having first and second inputs and an output, the output being connected to the first input of the first multiplier. In addition, if preferred, a buffer is connected to the outputs of the first and second integrators, seventh and eighth multipliers each having first and second inputs and an output, the first inputs of the multipliers being connected to outputs of the buffer; and third and fourth integrators, each having an input and an output, the inputs of the third and fourth integrators being connected to the outputs of the seventh and eighth multipliers.

In the preferred embodiment, the second input to the first multiplier is a code useful in descrambling a sequence applied to the first input to the first multiplier. In one embodiment the code is a pseudorandom noise code. The second inputs to the second and third multipliers are preferably codes useful in dechannelizing signals applied to the first inputs to the second and third multiplexers. In one exemplary embodiment, the codes are Walsh codes. In one preferred embodiment, the apparatus is implemented on a chipset.

BRIEF DESCRIPTION OF THE DRAWINGS

Preferred features of the present invention are disclosed in the accompanying drawings, wherein similar reference characters denote similar elements throughout the several views, and wherein:

FIG. 3(b) illustrates an exemplary matched filter (MF) searcher in accordance with a 3GPP TS synchronization embodiment of the invention.

FIG. 3(c) illustrates an exemplary matched filter (MF) searcher in accordance with a 3GPP MP searching embodiment of the invention.

FIG. 4(b) illustrates an exemplary searcher dataflow for the searcher processing unit in accordance with a 3GPP pilot assisted search embodiment of the invention.

FIG. 4(c) illustrates an exemplary searcher dataflow for the searcher processing unit in accordance with a 3GPP non-pilot assisted search embodiment of the invention.

DETAILED DESCRIPTION OF THE INVENTION

Figure 1A:
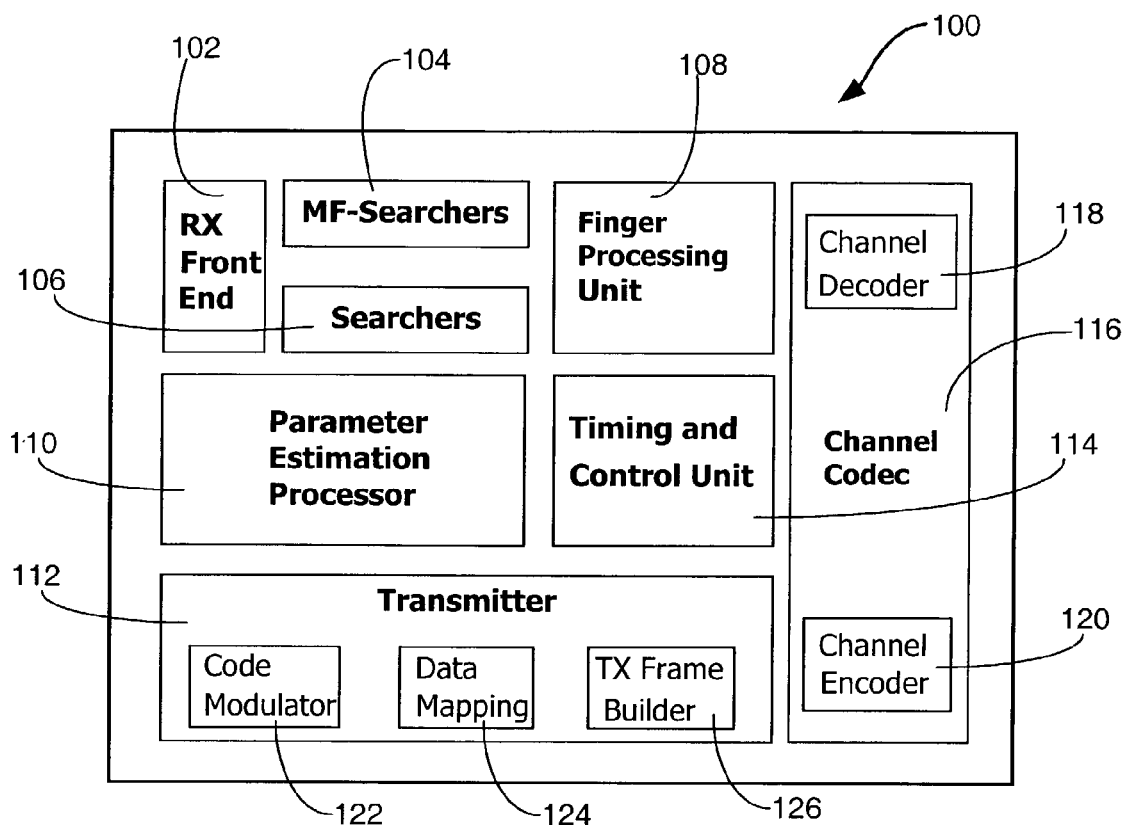
FIG. 1(a) illustrates an exemplary cellular terminal engine (CTE) in accordance with an embodiment of the invention.

A Configurable Terminal Engine (CTE) 100 is shown in block diagram form in FIG. 1(a). The CTE is a programmable Direct-Sequence Spread Spectrum (DS-SS) Waveform Processing Engine. This DS-SS signal processor supports complete digital baseband transceiver functionality for multiple standards. These multiple standards include: 3GPP-FDD, IS-2000-1X (including IS-95A & IS-95B), ARIB W-CDMA, GPS, 802.11b, and various proprietary systems.

As shown in FIG. 1(a), the CTE 100 includes an RX front end 102, matched filter (MF) searchers 104, searchers 106, finger processing unit 108, parameter estimation processor 110, and transmitter 112. The CTE 100 also has a timing and control unit 114 and a channel codec 116 that includes channel decoder 118 and channel encoder 120. The transmitter 112 has a code modulator 122, data mapping 124 and TX frame builder 126. All the component units in FIG. 1 except for the channel codec 116 constitute the modem of CTE 100.

The CTE 100 is provided as a Silicon Intellectual Property (SIP) core for integration into a baseband processor System-on-a-Chip (SoC) for handsets and terminals. The core includes all forward and reverse-link digital baseband processing from the digitized baseband I-Q data stream through the channel codec. The CTE SIP core is implemented using standard CMOS technology and is delivered as a hard-macro.

The CTE 100 is a new class of programmable, scalable signal processing engine and unlike most of today's modem and channel codec (chip-rate and symbol-rate) implementations, it is not a hard-wired ASIC. By applying novel computer architecture techniques, this DS-SS signal processor combines flexible programmability with the low power and high integration of a parameterized ASIC.

The CTE 100 provides programmable computing resources and flexible data and control flow connections to realize the receive path, transmit path, transmit/receive loops, and error correction and detection for DS-SS standards. The core provides a set of waveform and channel codec specific signal processing resources, which can be programmed by the user to realize a wide variety of detection and estimation algorithms and user-proprietary transceiver architectures. Advantageously, the programming can be accomplished using the Virtual Machine Interface (VMI) software described in the above-referenced copending application Ser. No. 09/828,381, filed Apr. 5, 2001, entitled "Virtual Machine Interface for Hardware Reconfigurable and Software Programmable Processors." This VMI software is an architecture-independent programming model that runs on a separate host processor, typically a microcontroller, chosen by the equipment or chipset maker.

The CTE 100 is available with a complete suite of development tools that support a customer through all phases of development. These development tools include a data flow simulator (DFS), µDSP tools, CTE FPGA based evaluation board and a CTE evaluation board. The DFS provides a software simulation environment for the CTE. DFS facilitates time-to-market by allowing the user to write host processor software in a flexible software based environment. With respect to the µDSP tools, the parameter estimation processor uses a µDSP to implement custom algorithms. The CTE 100 can be provided with a complete suite of tools (assembler, linker, simulator) that allows the user to write custom software. The CTE evaluation board is an evaluation board for software emulation that uses a CTE test-chip.

The available resources in the CTE 100 can preferably accommodate a wide variety of needs in a wide range of DS-SS applications. The CTE 100 provides specific programmable signal-processing resources to a user. These resources allow the user to maximize radio link performance by providing advanced functionality. The number of available resources can also be scaled with the input clock frequency.

Some of the key CTE system specifications are listed in Table 1 below:

TABLE 1

Key Specifications

| Feature | Description |
|---|---|
| Simultaneous Code Channels | Supports 8 code channels<br>3 multi-codes on DPCH/PDSCH, P/S-CPICH, P/SCCPCH (3GPP)<br>1 fundamental and 7 supplemental channels (IS-95B) |
| Simultaneous Radio Links | Up to 6 |
| Number of Receive Antennas | 1 or 2 |
| Enhanced Searcher Performance | Transmit diversity utilized to enhance multipath searching |
| Delay Spread | Any user defined value |
| Estimation Algorithms | User programmed<br>Non-causal and causal channel<br>FLL, DLL, finger lock, power control and transmit diversity |
| Turbo Decoder | User selectable Log-MAP or Max-Log-MAP algorithm<br>Proprietary quantization schemes provides results within 0.1 dB of floating point implementation<br>Adaptive decoding algorithm achieves desired SNR with minimum number of required iterations<br>Reduces number of iterations by up to 60%. |

The CTE 100 enables a common platform approach and supports a wide-range of terminal products, from low-end, voice-only products to high-speed data applications. The CTE 100 core enables further scalability by leaving the various memory buffers outside the core. These outside memory buffers include the RX buffer, the parameter estimation processor instruction and data memory, and the channel codec memory. The size of the RX buffer depends on the number of receive antennas (1 or 2), and channel estimation algorithms and the delay spread used by a customer. The memory requirements of the parameter estimation processor instruction and data memory will depend on the algorithms used by a customer. The channel codec memory will depend on the data-rates and Transmit Time Interval (TTI) supported by a specific product.

The number of specific resources available to the user can be scaled by changing the input clock frequency. For example, Tables 2 and 3 below show how the clock frequency can be changed for a possible system implementation to achieve a certain number of resources.

TABLE 2

Modem Resources

| System | Clock Speed (MHz) | Max Number of fingers | Max Number of searchers |
|---|---|---|---|
| IS2000-1X | 19.6608 | 16 | 16 |
| 3GPP | 61.44 | 16 | 16 |

TABLE 3

| | Codec Resources | | | | | |
|---|---|---|---|---|---|---|
| Clock | Number of Viterbi Decoded Channels | | Number of Turbo Decoded Channels | | | |
| Speed (MHz) | 12.2 kbps | 64 kbps | 64 kbps | 384 kbps | 768 kbps | 2 Mbps |
| 19.6608 | 12 | 3 | 10 | 2 | 1 | — |
| 61.44 | 40 | 10 | 30 | 7 | 4 | 1 |

The number of Viterbi decoded channels assumes a blind rate detection with searching over 4 trials.

These tables serve as an example to demonstrate how a user can vary the input clock frequency to change the number of available resources. This demonstrates the scalability available with the input clock frequency. The CTE 100 can be configured to a wide range of clock speeds for other DS-SS modem implementations besides those provided in the tables. Other considerations that will determine the choice of the input clock rate can be taken into account, e.g.; supported data rates, operating voltage, process technology, etc.

Figure 2:
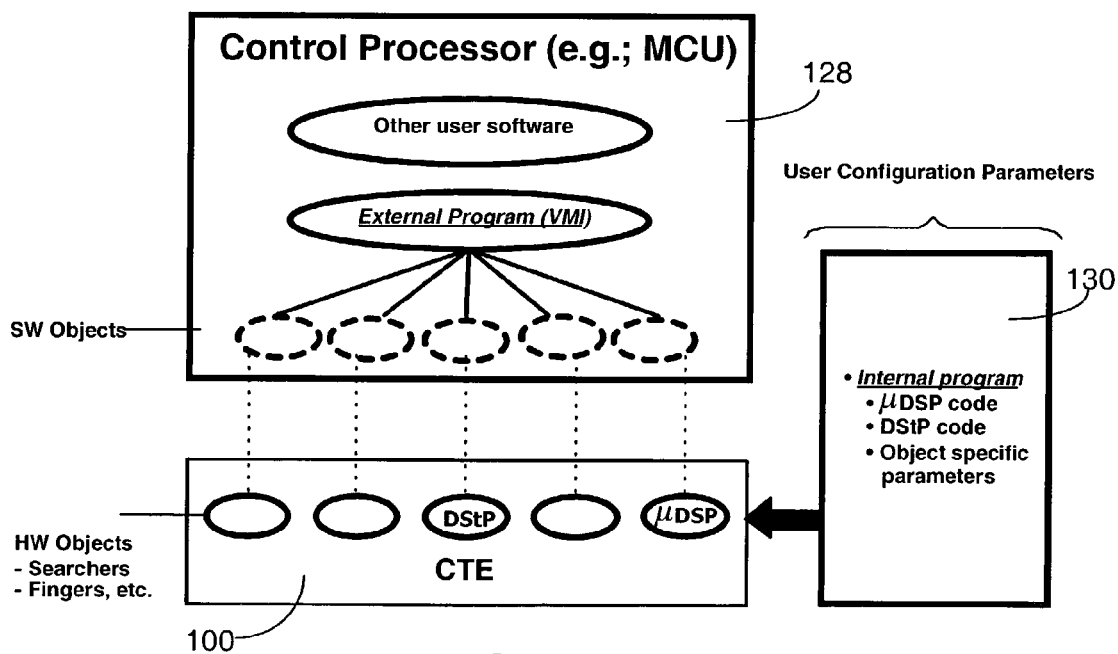
FIG. 2 illustrates an exemplary CTE programming model in accordance with an embodiment of the invention.

The CTE 100 can be programmed, as illustrated in FIG. 2, via two kinds of programs, external programs and internal programs 130.

The external programs are the programs that are executed external to the CTE 100 core, typically on a micro-controller 128 or another host-processor. These programs use VMI software library to control the data processing in CTE objects. As shown in FIG. 1(a), all of the CTE resources are programmed and managed in external programs.

The CTE 100 provides an intuitive programming model based on Virtual Machine Interface (VMI) Model. The CTE 100 can be provided with a VMI software library that is used to program and control CTE as software objects. The data and control flow can be dynamically changed via programming these software objects. This mechanism allows the user to program the CTE on a host processor preferably in ANSI C (i.e., American National Standards Institute C programming language). The user does not need to know any hardware details or write any hardware-drivers specific to CTE.

The internal programs 130 are software programs or other user programmable parameters that reside internal to the CTE core.

The CTE internal programs fall in two categories, namely the internal processor software and the object parameters. With respect to the internal processor software, for time critical tasks that require low processing latency, CTE has data-path embedded, user programmable processors (µDSP and DStP as described and illustrated herein). The object parameters include filter coefficients and other object specific parameters.

Most CTE objects or kernels as explained in this document have an input, output, parameters, and configuration parameters associated with them. These are defined as follows. The input is the input data, or other information from memory or another CTE block. The output is the output produced after processing the input data. The output may be available to one or more of the following interfaces: a VMI software via host processor interface; a user defined memory space; an input to the parameter estimation processor; and an input from another CTE block.

The program parameters include external program parameters that are controlled via external programs executed on a host processor and the internal programs that are the object specific parameters or programs that are executed internal to the CTE core on one of the data-path embedded processors. The configuration parameters are downloaded via a scan chain.

Additionally a Code Generation Unit (CGU) is associated with several blocks to generate user defined scrambling and spreading codes. For this reason the CGU appears as a parameter with several blocks.

The receive path processing in the CTE 100 can accommodate a wide range of DS-SS applications. The functional details of the CTE receive objects are described and illustrated herein.

Figure 1B:
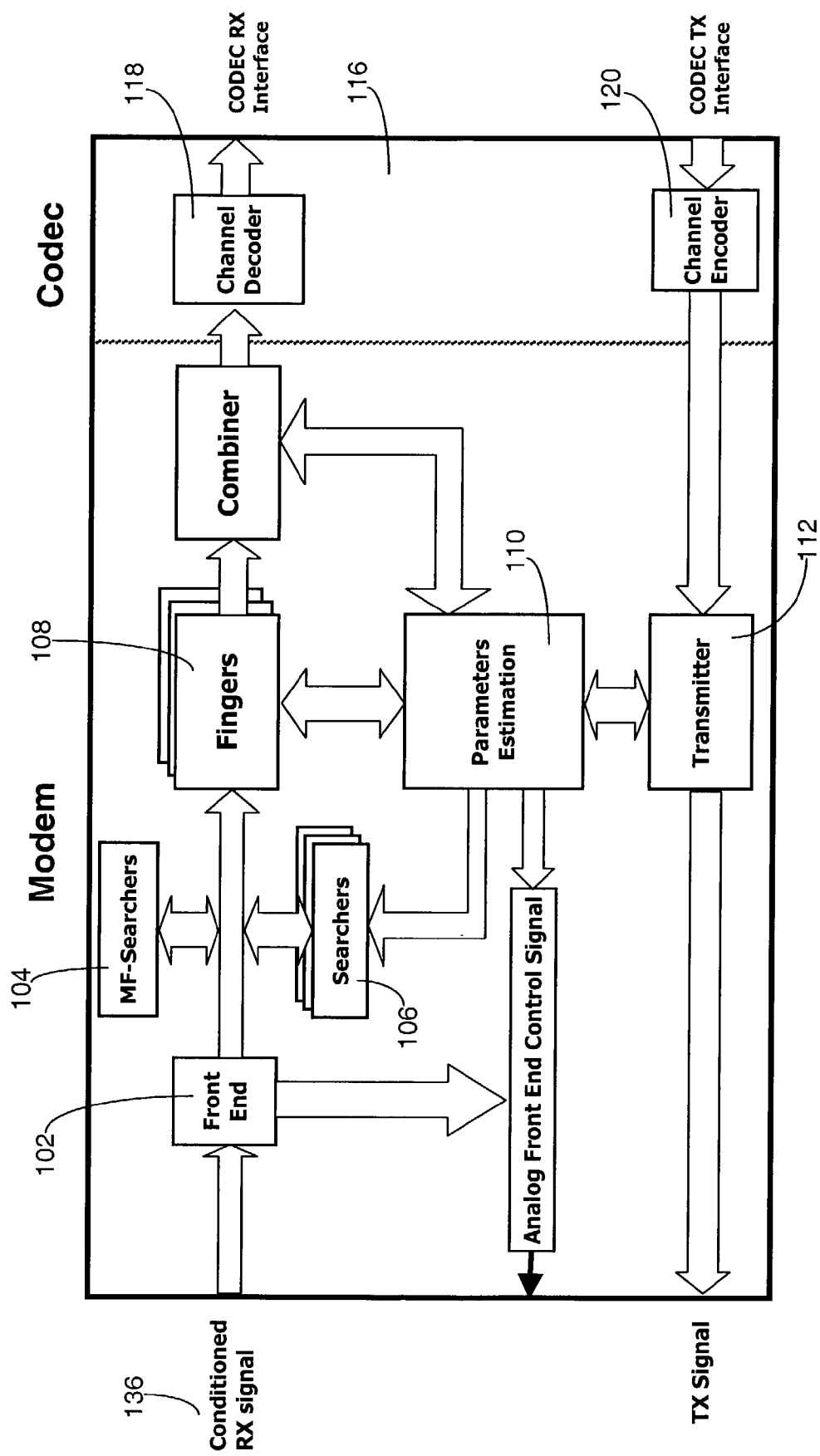
FIG. 1(b) illustrates an exemplary CTE dataflow in accordance with an embodiment of the invention.
Figure 12:
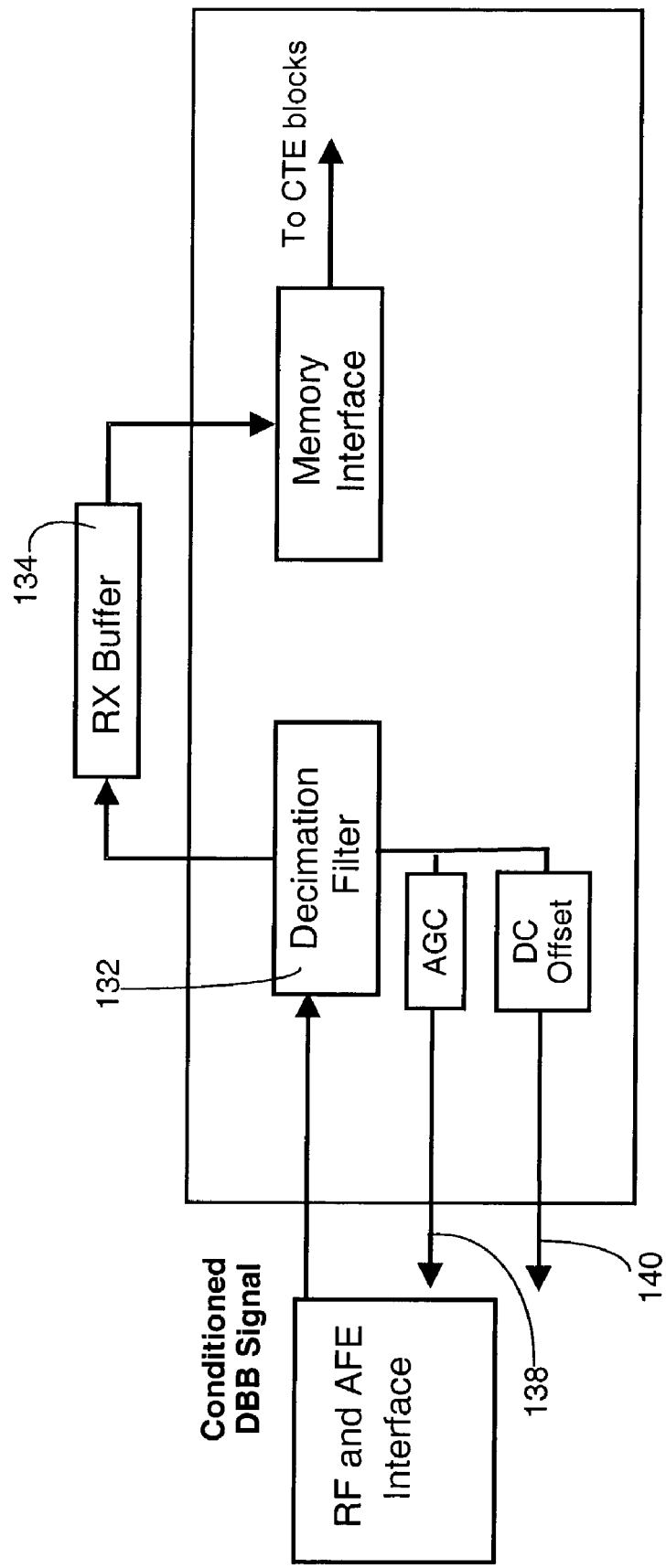
FIG. 12 illustrates an exemplary processing of the RX front end unit in accordance with an embodiment of the invention.

As shown in FIG. 1(b), the front-end processing unit 102 takes the input at a user selectable rate (2fc, 4fc, 8fc where fc is the sampling rate equal to the system chip-rate). The front end processing unit 102 supports diversity reception from 2 antennas, has programmable decimation filters, and has Input bit widths of 8-bits for I and 8-bits for Q. The input to the front-end processing unit 102 is an input baseband receive signal 136 shown in FIG. 1(b). A decimation filter 132, shown in FIG. 12, decimates the input to 2fc and stores it in the RX buffer 134 which, as previously noted, resides external to the core. The output also an AGC (Automatic Gain Control) output 138, and a DC offset correction signal 140, shown in FIG. 12.

The CTE 100 provides a general purpose interface to the RX memory. The size of the external RX buffer 134 depends on the supported delay spread, system, and type of channel estimation algorithms selected. Since the RX buffer is external to the core, the user has complete control over its size to allow for product and performance differentiation. Users can design and integrate appropriate RX-memory sub-system that meets their system requirements.

The internal program parameters 130 include the following: oversampling rate (2fc, 4fc, 8fc); number of receive antennas (1, 2); decimation filter coefficients; receive buffer size; RSSI input enable/disable; AGC enable/disable; and DC offset correction enable/disable.

Figure 3A:
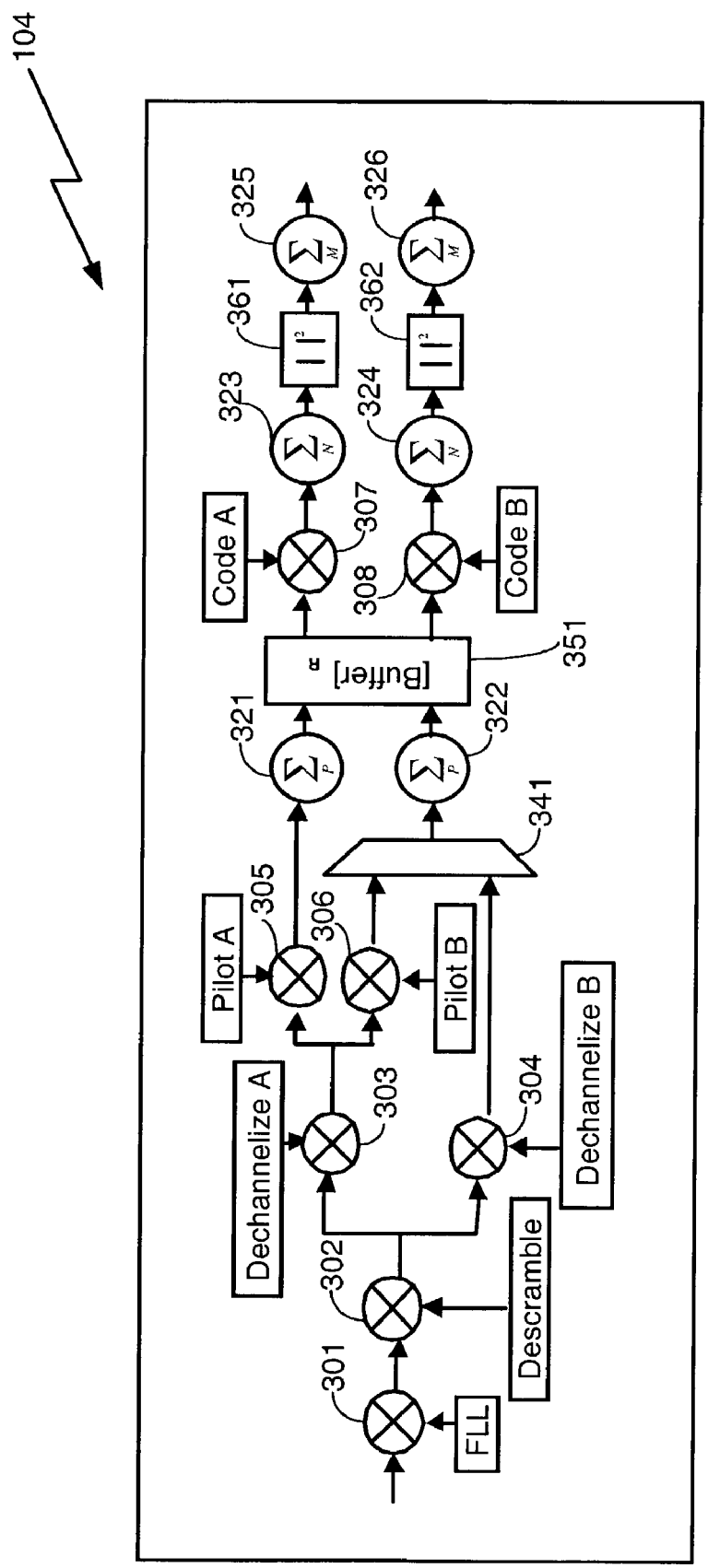
FIG. 3(a) illustrates an exemplary matched filter (MF) searcher in accordance with an embodiment of the invention.

Referring to FIG. 3(a), the Matched Filter Searcher 104 (MF-Searcher) comprises eight general purpose multipliers 301–308, six integrators 321–326, a multiplexer 341, a buffer 351 and first and second squaring circuits 361, 362. As shown in FIG. 3(a), an output of multiplier 301 is connected as an input to multiplier 302 and an output of multiplier 302 is connected as an input to multipliers 303 and 304. An output of multiplier 303 is connected as an input to multipliers 305 and 306. An output of multiplier 305 is connected as an input to integrator 321 and outputs of multipliers 304 and 306 are inputs to multiplexer 341. The output of multiplexer 341 is an input to integrator 322. Outputs of integrators 321 and 322 are supplied to buffer 351. The buffer has two output channels. In one channel a buffer output is connected as an input to multiplier 307, the output of multiplier 307 is connected as an input to integrator 323, the output of integrator 323 is connected as an input to squaring circuit 361 and the output of squaring circuit is connected as an input to integrator 325. The second output channel is identical and includes multiplier 308, integrator 324, squaring circuit 362 and integrator 326 connected in the same sequence. The CGU is configured to generate the reference sequence that is multiplied by the input sequence at the various multipliers.

Searcher 104 is used for several tasks in a wide variety of DS-SS systems. Some of the typical use cases for the MN-Searcher include cell synchronization—optimized for the cell search procedure and multipath searching.

The data flow of the MF-searcher 104 is shown in FIG. 3(a). A description will now follow of the input, outputs and the external program parameters for the MF-searcher 104.

The MF-searcher 104 receives as inputs the decimated output from the receive buffer and the estimated frequency error. The outputs from the ME-searcher 104 include the energy, the timing information and the frequency error. The highest energies as determined by the parameters are reported. With respect to the timing information, this is the timing information associated with each energy.

The external program parameters for the MF-searcher 104 include the following: antenna number (the receive antenna number from which date needs to be processed); slot format (slot format type for a particular channel); start offset (starting offset when used for multi-path searching); threshold above which energies are reported; number of windows (a timeslot (2560 chips) can be segmented in 1,2,4,5,8, or 10 windows for processing); number of energies (the total number of energies per timeslot (1–20) and the number of energies stored per window is specified. These energies can be distributed over different windows in any way user desires, as long as the maximum number of energies is less than 20 per timeslot); timeslots to accumulate (number of timeslots to accumulate for energy computation); coherent integration length (this is represented by N in the figure); non-coherent integration length (this is represented by M in the figure); transmit diversity mode (utilizes TX diversity pilot); search period (search duration); input frequency error (this is a set of five estimated input frequency errors. Each reported energy has one of these frequencies associated with it); FLL (Frequency Locked Loop) enable/disable (enables or disable frequency error correction on the input); and CGU.

The MF-searcher 104 performs the time slot synchronization for the CTE 100. In addition, the MF-searcher 104 employs an input frequency error which is a frequency offset number. By including the capability to remove frequency offsets, performance is improved by decreasing probability of false alarm and increasing the probability of detection. This can be accomplished by allowing the receiver to integrate over a longer period of time, when compared to the case when the frequency offset is present.

Figure 3D:
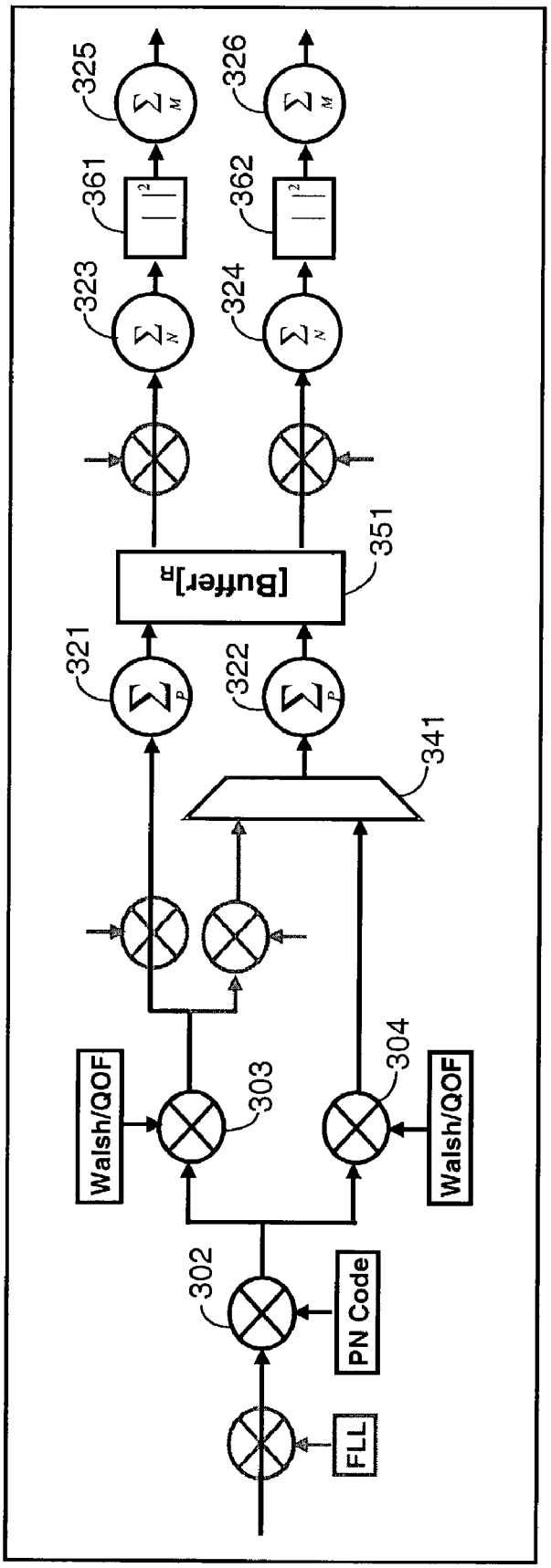
FIG. 3(d) illustrates an exemplary matched filter (MF) searcher in accordance with an IS2000 cell synch/MP searching embodiment of the invention.

The MF-searcher 104 is configurable for different standards in various preferred embodiment configurations. Configuration is achieved by selectively by-passing or eliminating certain of the elements of the searcher circuit 104 of FIG. 3(a). For example, FIG. 3(b) exemplifies an MF-searcher with a 3GPP TS synchronization, FIG. 3(c) with a 3GPP MP searching embodiment, and FIG. 3(d) with an IS2000 cell synch/MP searching embodiment. In these figures, a solid black data line through the element or presentation of the element in gray shading without an element number indicates that the element has been by-passed or eliminated. In FIG. 3(b), multipliers 303, 304, 305, 306 308, multiplexer 341, integrators 322, 324, 326 and squarer 362 are bypassed or eliminated. In FIG. 3(c), multipliers 304, 307, 308 and integrators 321, 322 are bypassed or eliminated; and in FIG. 3(d), multipliers 301, 305, 306, 307, 308 are bypassed or eliminated. In each case, N is the coherent integration length and M is the non-coherent integration length. Specific values of N and M can be selected depending on the system performance requirements. In the embodiment shown in FIG. 3(b), N and M are preferably selected so that 16*N*M=256. In the embodiments shown in FIGS. 3(c) and 3(d), N*M is preferably the total integration length.

Figure 4A:
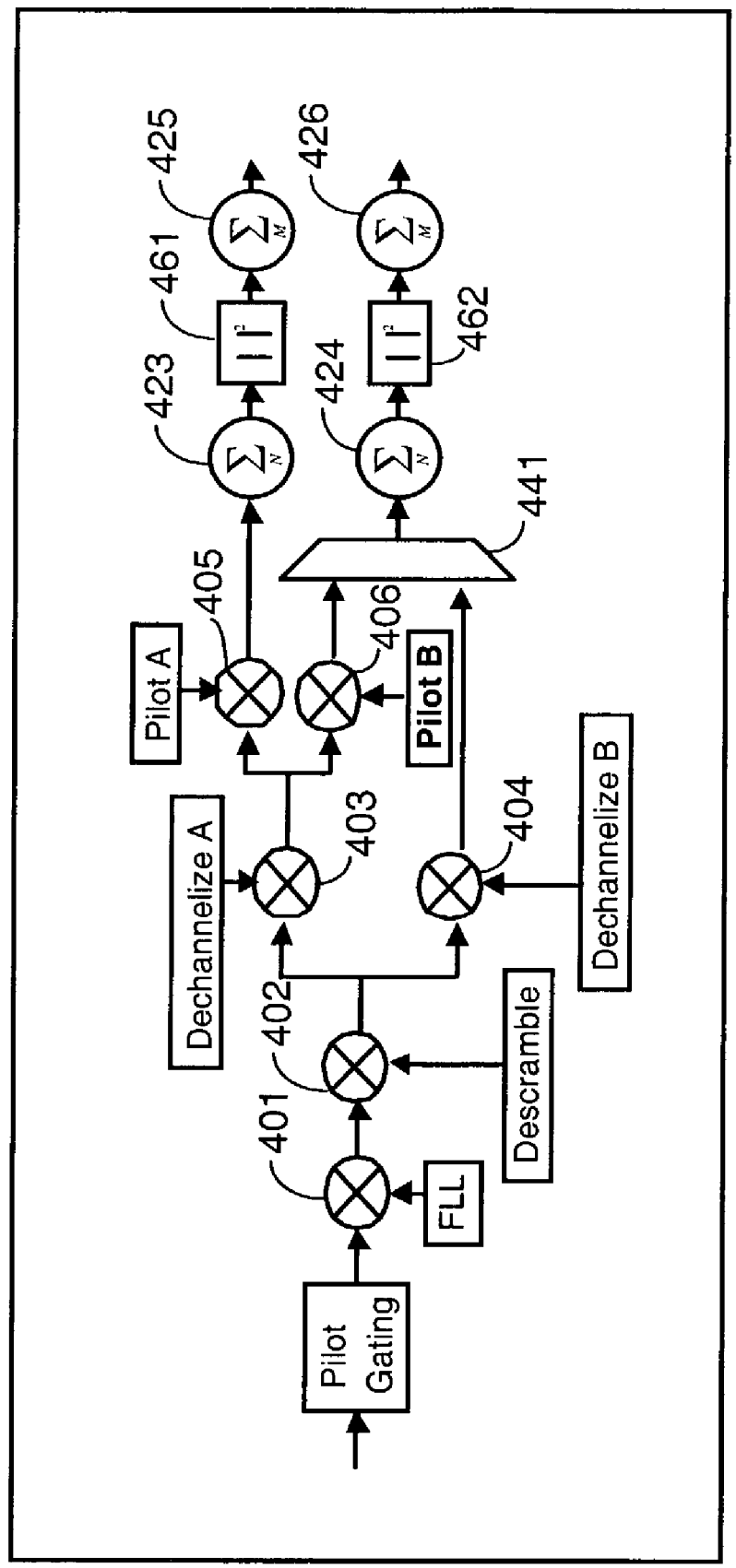
FIG. 4(a) illustrates an exemplary searcher dataflow for the searcher processing unit in accordance with an embodiment of the invention.

The CTE 100, as shown in FIGS. 1(a) and 1(b), also includes a searcher processing unit 106, shown in FIG. 4(a). Searcher processing unit comprises six general purpose multipliers 401–406, four integrators 423–426, a multiplexer 441 and squaring circuits 461 and 462. As will be apparent, the block diagram of processing unit 106 is similar to that of processing unit 104 except that there is no buffer, no integrators at the input to the buffer and no multipliers at the output of the buffer. Accordingly, like elements in FIG. 4(a) have been given the same numbers as the corresponding elements in FIG. 3(a) increased by 100. The connection of the elements is the same as that in FIG. 3(a) with an output of multiplier 405 being connected as an input to integrator 423 and an output of multiplexer 441 being connected as an input to integrator 424.

Searcher processing unit 106 is used for the following purposes: searching new multi-paths for tracking to add to the active set; measuring signal strength of the active and adjacent cells; frame synchronization; 3GPP frame synchronization; primary downlink scrambling code group identification; primary downlink scrambling code identification; IS2000 initial pseudorandom noise (PN) acquisition; and 3GPP monitored cell synchronization. The searcher dataflow is shown in FIG. 4(a).

The searcher processing unit 106 receives as an input the decimated output from the receive buffer. The outputs of the searcher processing unit 106 includes the energy levels with the corresponding offsets and timing information.

The key features of the searcher include the following: user-configurable number of searchers; user-programmable searcher algorithms; low-power architecture; and applicable across a variety of physical channels.

The user-configurable number of searchers enables very fast-multi-path acquisition time by providing parallelism, vast pool of available searchers, e.g., 16 searchers at 61.44 MHz input clock for 3GPP and lower call drop rate and enhanced performance.

The user-programmable searcher algorithms include user programmed threshold, coherent, and non-coherent integration lengths; user programmed number of search dwells (up to 3); diversity-reception; pilot and non-pilot assisted; frequency-error corrected operation that allows longer integration lengths; and transmit diversity aided.

The low-power architecture allows idle searchers to be programmed to not consume power.

The broad applicability of the searcher includes the ability to operate on common or dedicated channels and on coarse/precision code channels.

The external program parameters for the searcher processing unit 106 include the following: antenna number (searcher usage—Rx antenna number 1 or 2)); pilot assisted/non-pilot assisted; pilot enable/disable (searcher usage—enables or disables pilot gating to allow pilot assisted and non-pilot assisted); dwell algorithm selection (searcher usage—identifies dwell state machine configuration for a searcher); slot format (searcher usage—slot format type for a particular channel); start offset (searcher usage—starting offset for a searcher); coherent integration length (this is represented by N in FIG. 4(a); non-coherent integration length (this is represented by M in FIG. 4(a); threshold (DSM usage—only energies above this threshold are reported); transmit diversity mode (searcher usage—utilizes TX diversity pilot); search period; timeslots to detect for primary code group identification; code group for primary code group identification; code group rejection (the code groups specified by this parameter are not searched); code group authorization (only the code groups specified by this parameter are searched); and CGU.

Figure 4D:
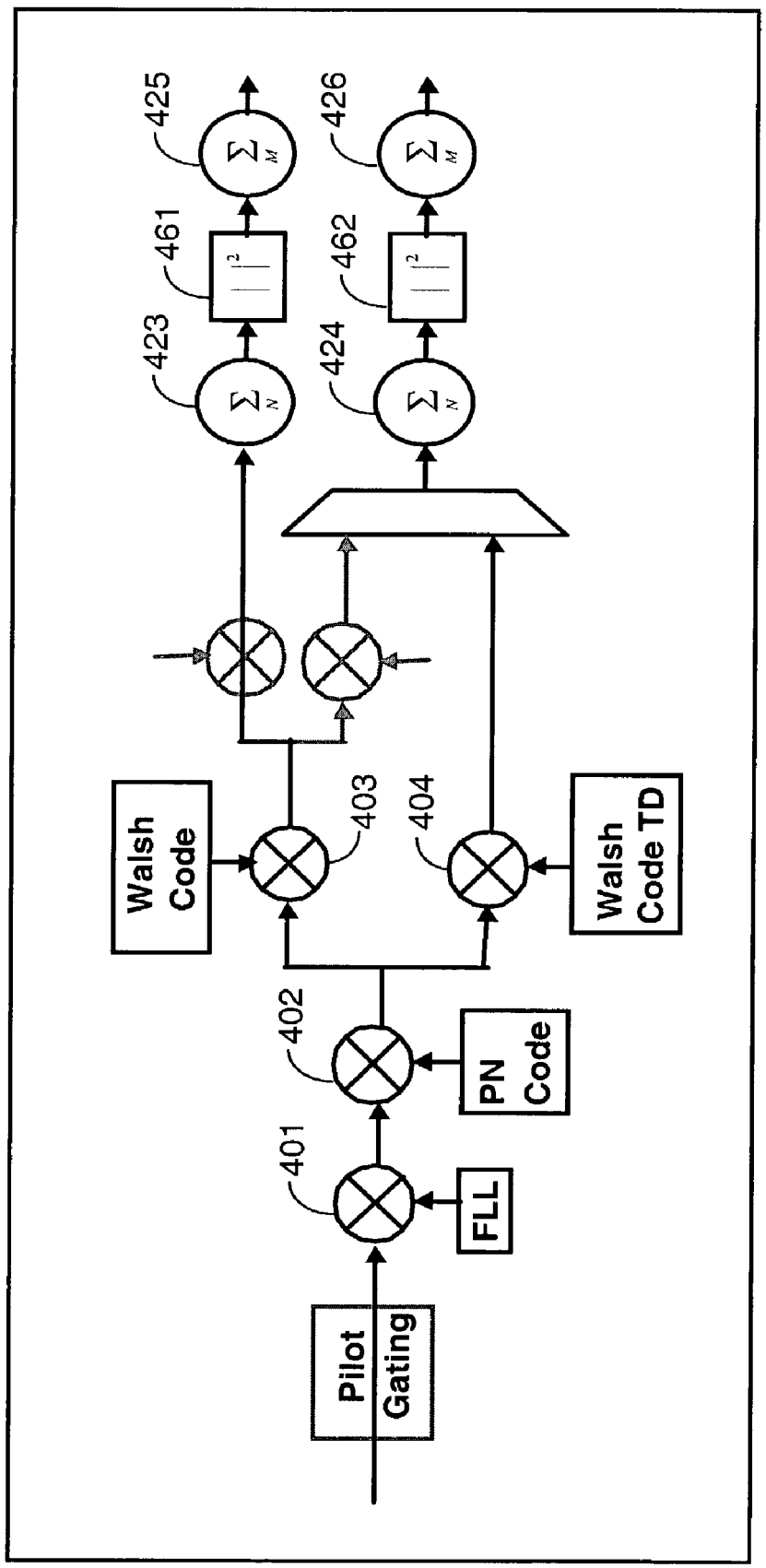
FIG. 4(d) illustrates an exemplary searcher dataflow for the searcher processing unit in accordance with an IS2000 pilot search embodiment of the invention.

As with the MP-searcher 104, the searcher processing unit 106 is configurable for different standards in various preferred embodiment configurations. Again, configuration is achieved by selectively bypassing or removing certain of the elements of the searcher unit 106 of FIG. 4(a). For example, FIG. 4(b) exemplifies a search with a 3GPP pilot assist embodiment, FIG. 4(c) with a 3GPP non-pilot assist embodiment, and FIG. 4(d) with an IS2000 pilot search embodiment. In FIG. 4(b), multiplier 404 is removed, thereby eliminating one of the two input to multiplexer 441 and eliminating any need for multiplexer operation. In FIG. 4(c), multipliers 404, 405 and 406 are by passed or eliminated, multiplexer 441 is eliminated and the second output channel of integrators 424, 426 and squaring circuit 462 is eliminated. In FIG. 4(d), multiplier 405 is bypassed and multiplier 406 is eliminated. As a result, the only input to multiplexer 441 is from multiplier 404, thereby eliminating any need for multiplexer operation. The N and M parameters are the same as described with respect to the MF searcher 104, namely N*M is the total integration length.

As shown in FIG. 1(a), the CTE 100 also includes finger processing unit 108. The fingers are generic resources that can be configured according to specific code/data modulation formats and parameterized in configurations suitable for a particular system. Each finger can support a variable spreading factor and chipping rate.

The finger-detection path does the data detection for the physical and logical channels, as well as the creation of the early and late signal for DLL operation. The finger processing unit 108 provides for data combining and demodulation; energy and timing information for measurements; TPC bit combining; on-time, early, and late de-spread symbols for parameter estimation; paging indicator channel detection and decoding; and acquisition indication channel detection and decoding.

Figure 5A:
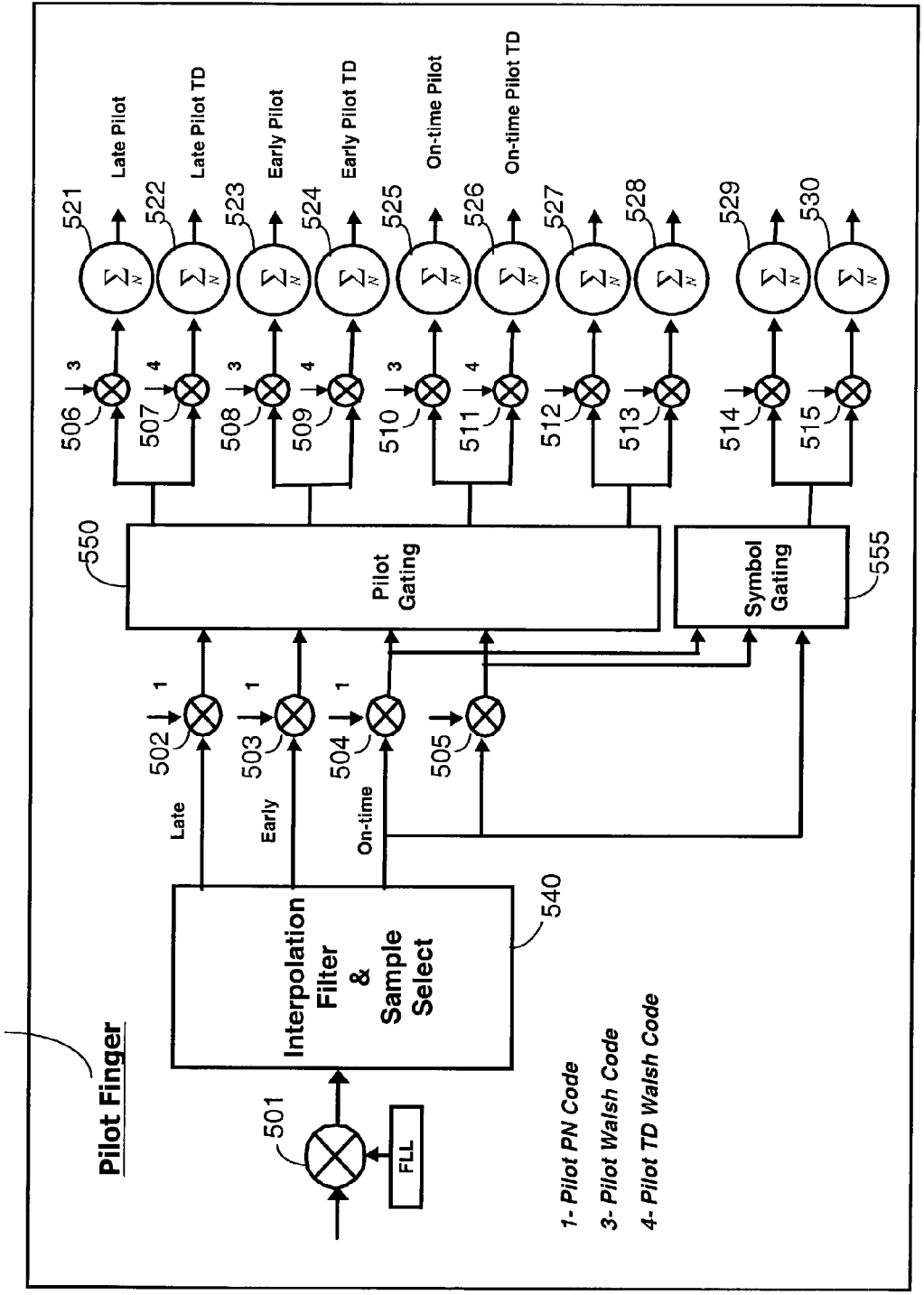
FIG. 5(a) illustrates an exemplary pilot finger in accordance with an embodiment of the invention.
Figure 5B:
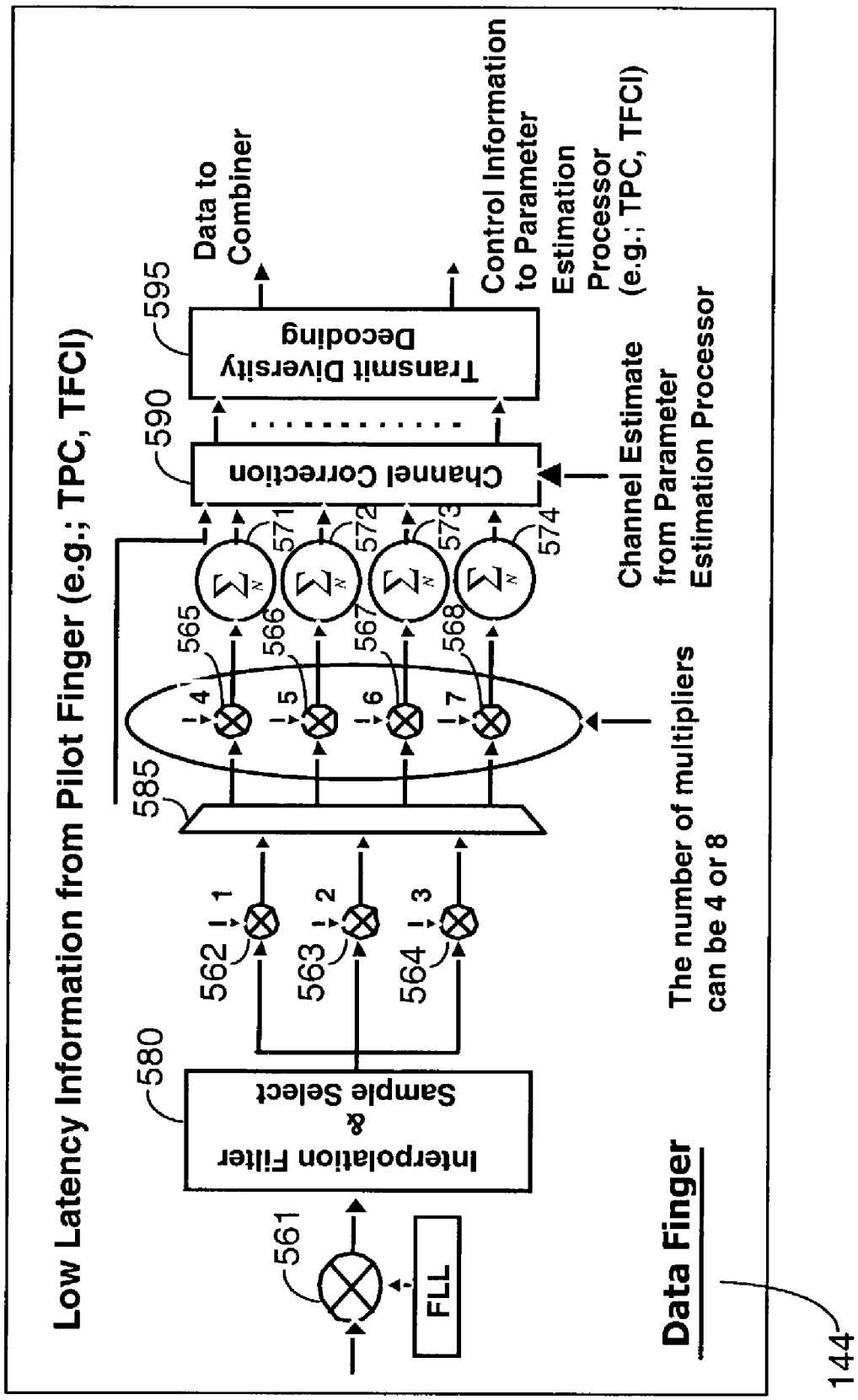
FIG. 5(b) illustrates an exemplary data finger in accordance with an embodiment of the invention.

An exemplary embodiment of a CTE 100 finger includes a data finger and a pilot finger. Block diagrams of the pilot finger 142 and data fingers 144 are shown in FIGS. 5(a) and 5(b). Pilot finger 142 comprises multipliers 501–515, integrators 521–530, interpolation filter and sample select 540, pilot gating 550, and symbol gating 555. The input to the pilot finger is applied to multiplier 501 whose output is provided as an input to interpolation filter and sample select 540. The output of interpolation filter and sample select is supplied to inputs to multipliers 502–505 as well as to symbol gating block 555. The output of multipliers 502 and 503 is supplied to pilot gating block 550. The output of multipliers 504 and 505 is supplied to both pilot gating block 550 and symbol gating block 555. The output of pilot gating block is supplied as inputs to multipliers 506–513 and the output of symbol gating block is supplied as inputs to multipliers 514, 515. The outputs of multipliers 506–515 are supplied as inputs to integrators 521–530.

Data finger 144 comprises multipliers 561–568, integrators 571–574, interpolating filter and sample select 580, multiplexer 585, channel correction block 590, and transmit diversity decoding block 595. The input to the data finger is supplied to multiplier 561 whose output is provided as an input to interpolation filter and sample select 580. The output of interpolation filter and sample select is supplied as inputs to multipliers 562–564. The outputs of multipliers 562–564 are supplied as inputs to multiplexer 585. The output of multiplexer 585 is supplied to multipliers 565–568; and the outputs of multipliers 565–568 are supplied as inputs to integrators 571–574. The outputs of the integrators are provided to channel correction block 590 and then to transmit diversity decoding block 595.

The second input to the multipliers shown in the figures is generated by a flexible CGU.

The external program parameters for interpolation filter include the following: antenna number (searcher usage—RX antenna number (1 or 2)); start offset (searcher usage—starting offset for a searcher; pilot enable/disable (searcher usage—enables or disables pilot gating to allow pilot assisted and non-pilot assisted); dwell algorithm selection (searcher usage—identifies dwell state machine configuration for a searcher); slot format (searcher usage—slot format type for a particular channel); transmit diversity (searcher usage—utilizes TX diversity pilot); coherent integration length (this is represented by N in FIG. 4(a); non-coherent integration length (this is represented by M in FIG. 4(a); threshold (DSM usage—only energies above this threshold are reported).

The finger processing unit 108 supports non-causal channel estimation with either chip-level buffering or symbol level buffering. It also supports causal channel estimation.

Some of the key features of the finger processing unit 108 are: each finger supports up to 8 simultaneous spreading code channels; each finger supports 3 simultaneous scrambling codes; each finger has transmit diversity processing path; supports up to six simultaneous radio links in soft-decision; and low latency TPC bit combining. The aforementioned features are related to the user configurable number of fingers which also include a large number of multipaths per radio-link for lower call drop rate and enhanced signal quality (e.g., 16 fingers at 61.44 MHz clock for 3GPP).

Other features of the finger processing unit 108 include user programmable finger algorithms; and low power architecture.

The finger detection path comprises interpolation filter which provides data at 8fc; de-scrambler; de-channelizer; code generation unit; and integrate-and-dump unit.

The inputs for the finger processing unit 108 include: decimated output from the receive buffer; and information from parameter estimation processor to compensate for timing, frequency, amplitude, and phase error for each finger.

The outputs from the finger processing unit 108 include: channel compensated soft-decision output symbols (6 bits/symbol) to the channel codec memory space; despread symbols from each finger to the parameter estimation process; early and late signals for DLL operation in parameter estimation processor. The second input to the multipliers as shown in these FIG. 5 is generated by a flexible CGU.

The external program parameters for the finger processing unit 108 include the following: antenna number; timing information for each multipath to track; transmit diversity mode; channel estimation type; and CGU.

The internal program parameters for the finger processing unit 108 includes interpolation filter coefficients.

Figure 5C:
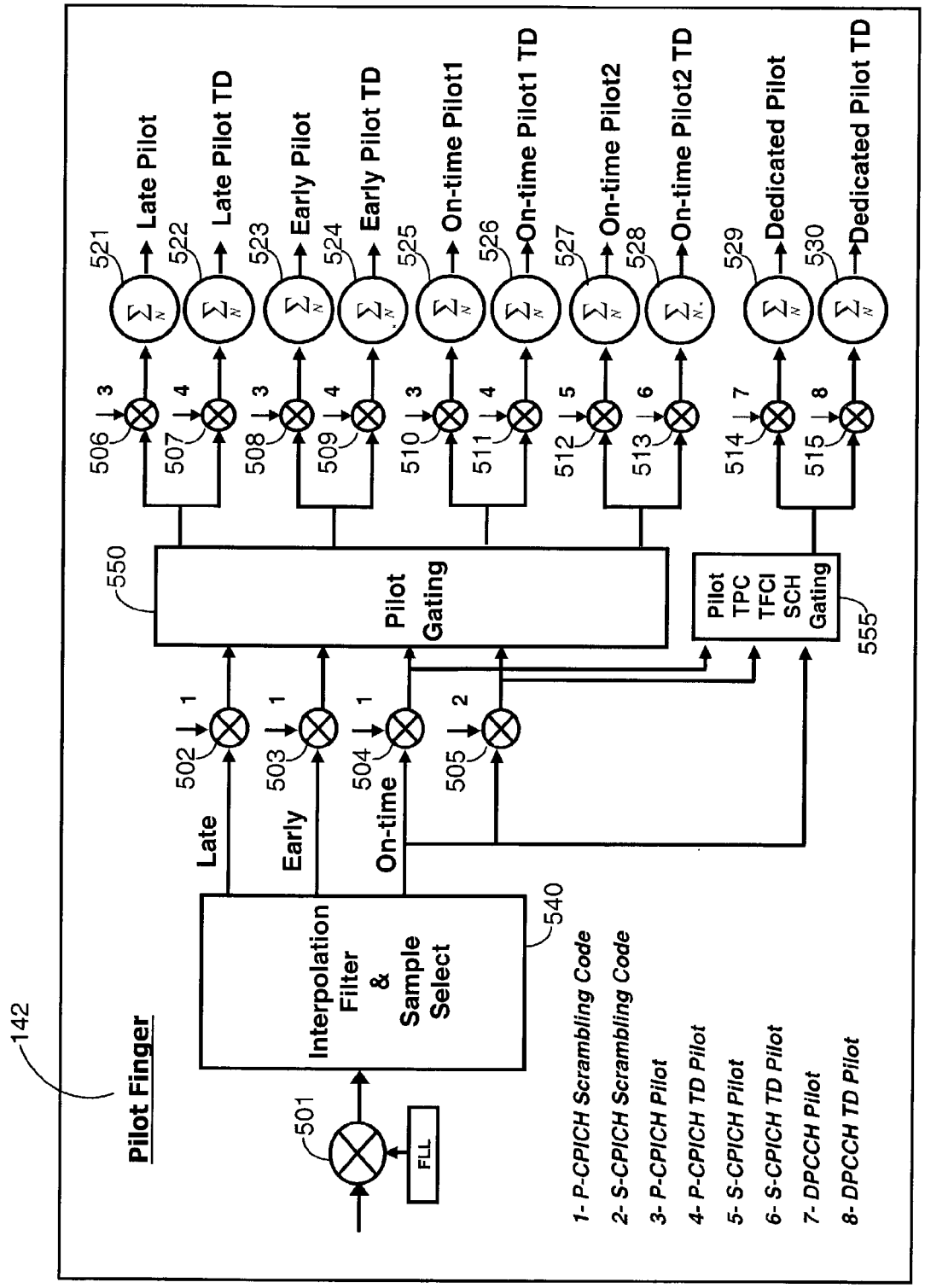
FIG. 5(c) illustrates an exemplary 3GPP pilot finger in accordance with an embodiment of the invention.
Figure 5D:
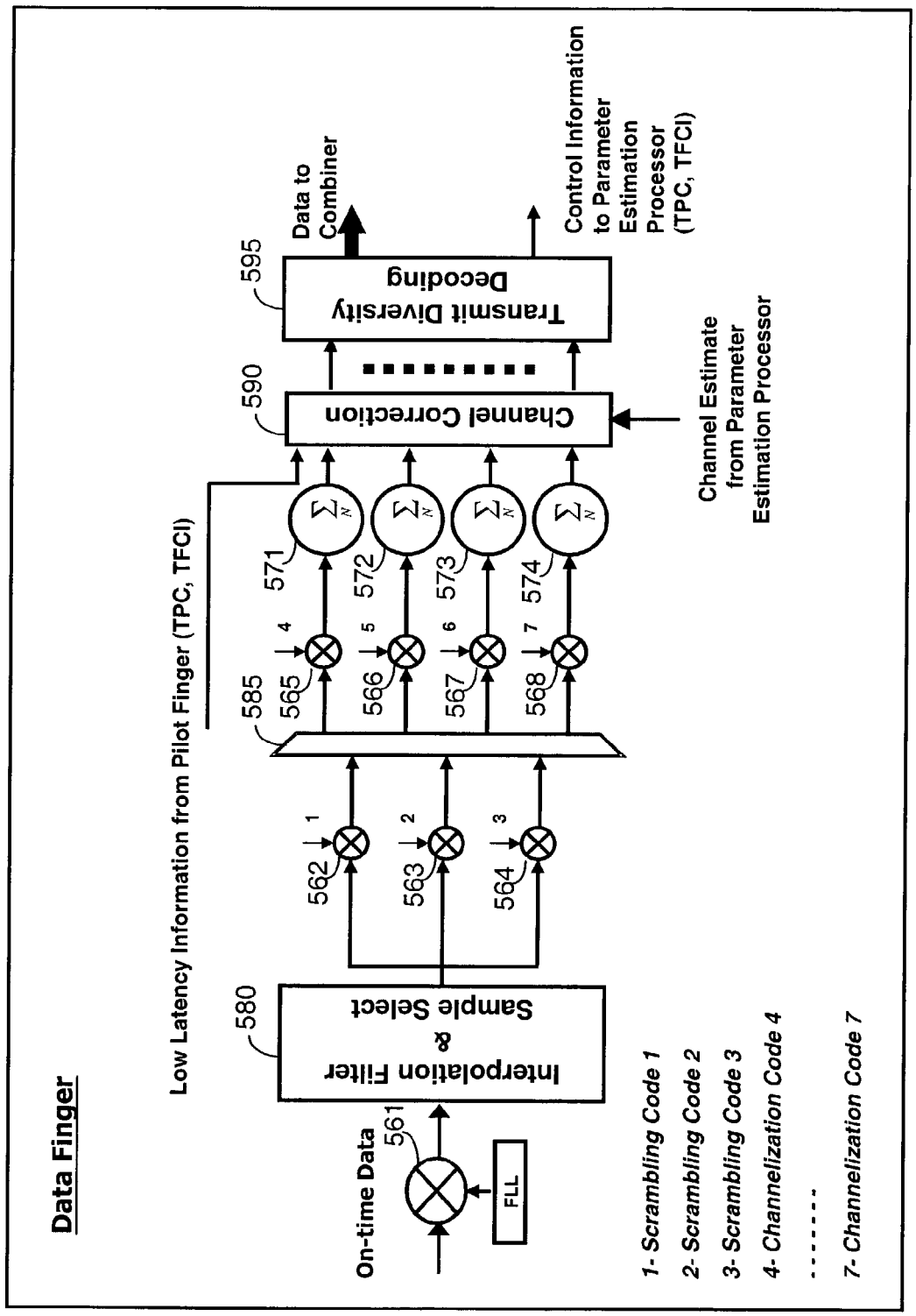
FIG. 5(d) illustrates an exemplary 3GPP data finger in accordance with an embodiment of the invention.
Figure 5E:
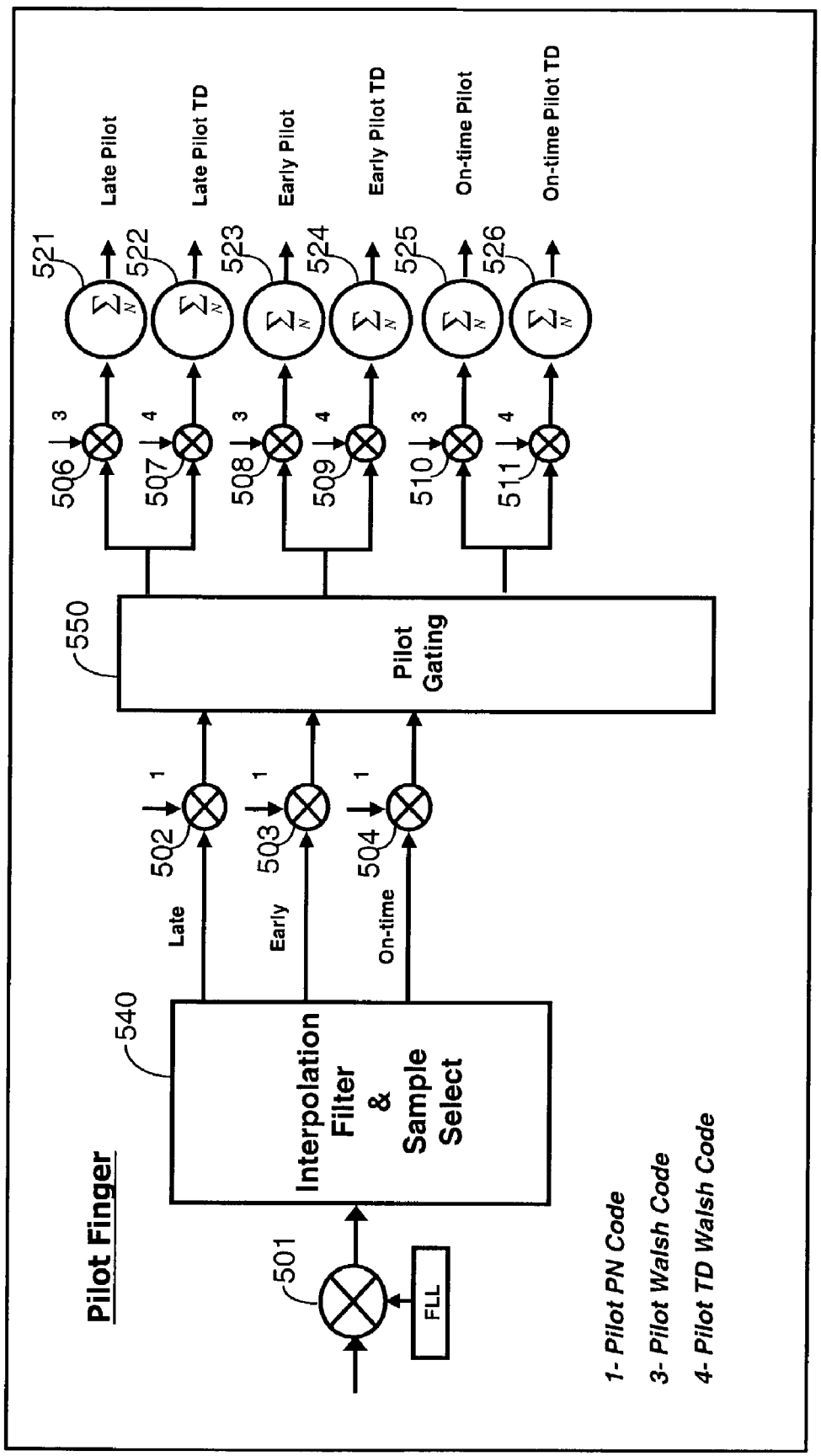
FIG. 5(e) illustrates an exemplary IS2000 pilot finger in accordance with an embodiment of the invention.
Figure 5F:
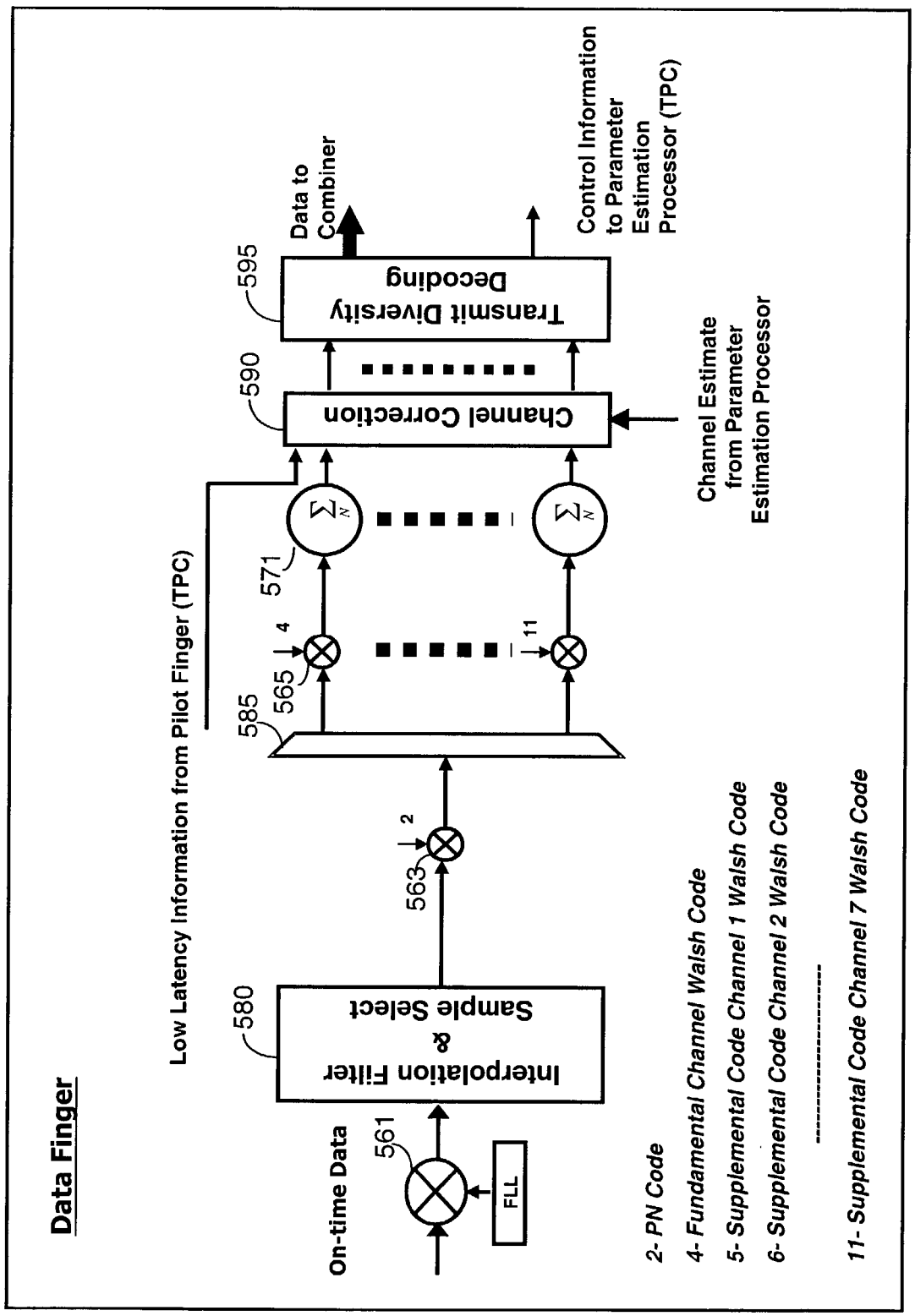
FIG. 5(f) illustrates an exemplary IS2000 data finger (IS95B configuration) in accordance with an embodiment of the invention.

Alternative embodiments of the pilot and data fingers are shown in FIGS. 5(c) through 5(f). 3GPP pilot finger and data finger embodiments are illustrated in FIGS. 5(c) and 5(d), respectively. These elements are essentially the same as those of FIGS. 5(a) and 5(b), respectively, and bear the same numbers. An IS2000 pilot finger is shown in FIG. 5(e) and an IS2000 (IS95B configuration) data finger is illustrated in FIG. 5(f). The elements of these figures are a subset of those of FIGS. 5(a) and 5(b). In particular multipliers 505, 512–515, integrators 527–530 and symbol gating 555 are not used in FIG. 5(e); and multipliers 562 and 564 are not used in FIG. 5(f).

Figure 6:
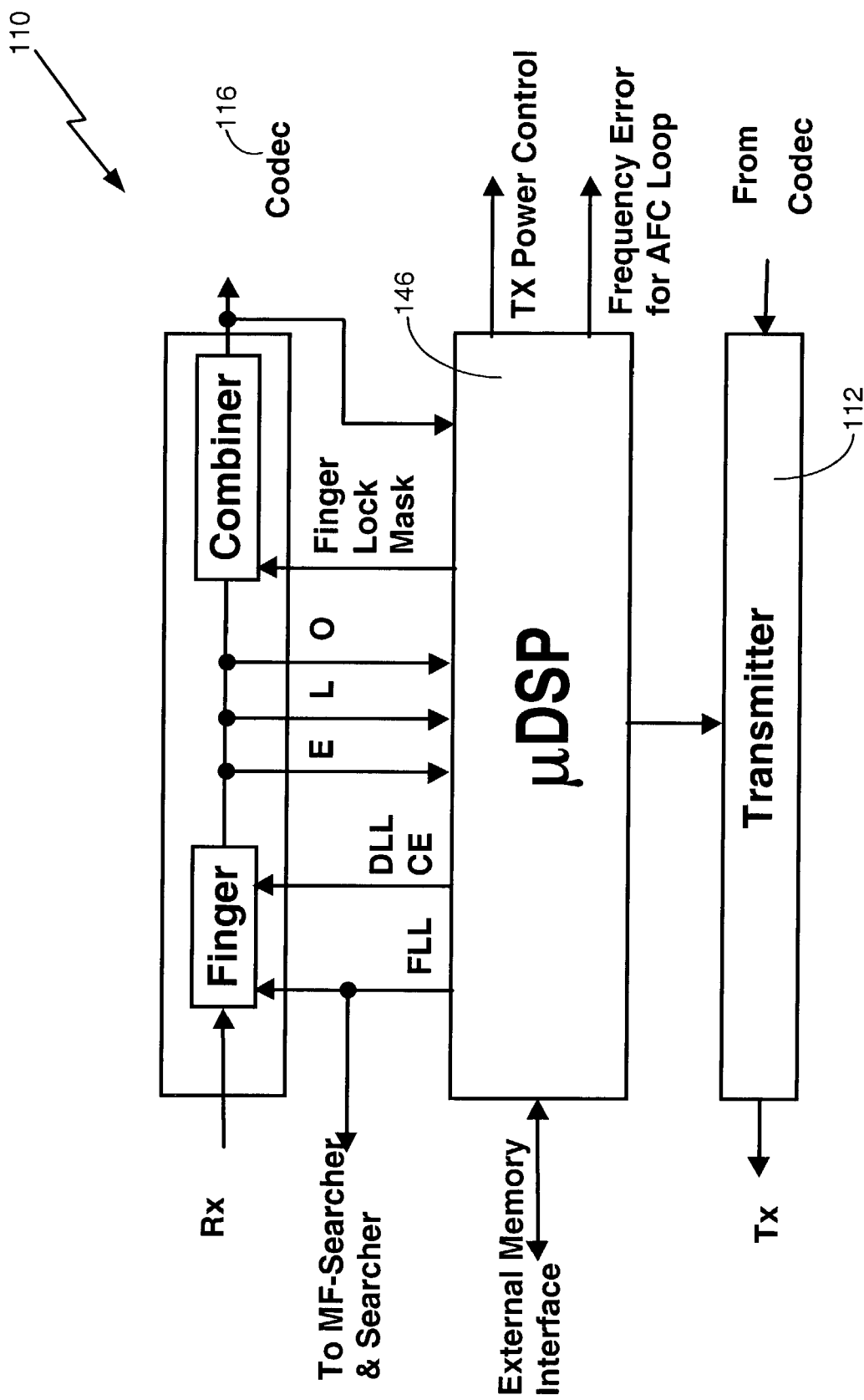
FIG. 6 illustrates an exemplary parameter estimation processor in accordance with an embodiment of the invention.

The CTE 100 includes a parameter estimation processor 110, as shown in FIG. 6, which can accommodate a wide range of DS-SS applications. It has a user programmable μDSP 146 that is used to implement software-based algorithms. The CTE 100 is provided with a complete suite of tools for software and hardware development.

The CTE 100 parameter estimation processor 110 is used to perform the following functions: delay locked loop (DLL); frequency locked loop (FLL); uplink power control; downlink power control; channel estimation; finger lock management; and transmit diversity detection and decoding.

The parameter estimation processor has input and output interfaces that can be utilized in a wide range of DS-SS applications. The programmable μDSP 146 can be used to implement any user specified algorithm. The example shown in this section is one of the many possible examples of a DS-SS system.

The parameter estimation processor provides additional scalability and flexibility by providing general purpose external memory interface for instruction and data memories for the data-path embedded μDSP. Hence, the instruction and data memories reside external to the CTE core. This allows the user to design appropriate memory sub-systems depending on the system and algorithmic complexity of the desired estimation algorithms.

The CTE 100 parameter estimation processor include the following features: generic external memory interface for instruction and data memory; ability to run at a set of higher clock frequencies than the rest of the core for additional computing power; proprietary μDSP; 33 bit instruction set architecture; 40 bit accumulate; and execution of up to 3 operations in parallel.

In the case of the embodiments of 3GPP and IS2000-1X Applications, the parameter estimation processor 110 may be used to perform the following functions: delay locked loop (DLL); frequency locked loop (FLL); uplink power control; downlink power control; channel estimation; finger lock management; closed loop transmit diversity modes 1 and 2; site selection diversity transmission (SSDT); and transmit diversity detection and decoding.

The key features of the parameter estimator are: flexibility of a programmable digital signal processor for each finger; the ability to support fully user-defined algorithms; and an extensible and scalable architecture that allows modular construction.

The flexibility of a programmable digital signal processor for each finger provides for data-path embedded user programmable 16 bit μDSP 146; and significantly less traffic external to modem resulting in lower power consumption. The use of user-programmed parameter estimation algorithms enables differentiation.

The ability to support fully user-defined algorithms enables: support of both causal and non-causal channel estimation; channel estimation from dedicated and/or common channels; and support of user-defined selection of data in receive stream to perform estimation.

The extensible and scalable architecture allows modular construction which include: instruction and data memories that are external to the CTE core allowing application and customer specific memory usage for cost optimization; and ability to run at higher clock rates than the rest of the CTE system for increased performance.

The delay locked loop (DLL)148 shown in FIG. 6 of the parameter estimation processing unit 110 ensures that a finger tracks the multi-path accurately. The inputs of the DLL allows for early and late de-spread symbols from each finger. The output of the DLL allows for a timing adjustment signal to each finger.

The DLL has external program parameters that include: pilot assisted/non-pilot assisted; channel-type; slot format; integration length; post detection integration length; and transmit diversity on/off.

The DLL has internal program parameters that are the loop filter algorithm software.

The parameter estimation processing unit 110 has a frequency locked loop (FLL) which measures and corrects any frequency error on the input signal. The FLL has inputs that despread pilot symbols. The FLL has outputs that monitor frequency error per cell; and frequency error for external AFC loop. For the internal program parameter, the FLL has the loop filter algorithm software.

The CTE 100 has an uplink power control in which the TPC bits are extracted from the downlink channel and are combined according to the supported standard to produce appropriate power control commands. The power control commands are provided outside the CTE core so that the user can use it as part of the transmit power control loop.

The inputs of the CTE 100 uplink power control are TPC bits from each cell at the combiner output.

The outputs of the CTE 100 uplink power control are standard specific power up or down commands.

The external program parameters of the uplink power control include a transmit diversity mode.

The internal program parameters of the uplink power control includes the uplink power control algorithm software.

The CTE 100 also includes downlink power control which has as its inputs the de-spread symbols and causal channel estimate.

The CTE 100 outputs a TPC field for the uplink channel.

The internal program parameters for the CTE 100 include: downlink power control algorithm software; and filter coefficients.

The CTE 100 provides for a channel estimation which allows the user to calculate a channel estimate for each multi-path and then applies it to each finger. The user has complete flexibility to implement custom channel estimation algorithms in software.

If non-causal channel estimation is used, then the additional number of chips that are stored in the RX buffer is: Number of chips=Number of RX antennas*2560 chips/timeslot.

The inputs for the channel estimation includes de-spread symbols. The output of the channel estimation includes phase and amplitude correction for each finger.

The CTE 100 channel estimation parameters include: channel type; causal/non-casual estimation; number of time slots for non-causal estimation; and TX diversity.

The CTE 100 channel estimation internal program parameters include the channel estimation algorithm software.

The CTE 100 includes a finger lock that-produces the lock mask of the currently assigned fingers to a combiner.

The inputs for the CTE 100 finger lock includes finger energy. The outputs include the lock mask; lock and combine; lock and no-combine; and out of lock.

The internal program parameters for the CTE 100 finger lock includes the finger lock algorithm software; and filter coefficients.

The closed loop transmit diversity function supports closed-loop transmit diversity mode 1 and 2.

The inputs for the closed loop transmit diversity includes channel estimate for all cells in the active set.

The outputs for the closed loop transmit diversity include TX diversity bits of the FBI field for the uplink transmitter.

The external program parameters for closed loop transmit diversity provides channel type.

The internal program parameters include: closed loop transmitter diversity algorithm; and antenna verification algorithm.

The inputs for the Site Selection Diversity Transmission (SSDT) include received signal code power (RSCP) of the common pilot channel of all cells in the active set.

The outputs for the SSDT include SSDT bits of the FBI field for the uplink transmitter.

The internal program parameters include the primary cell identification algorithm.

Figure 7:
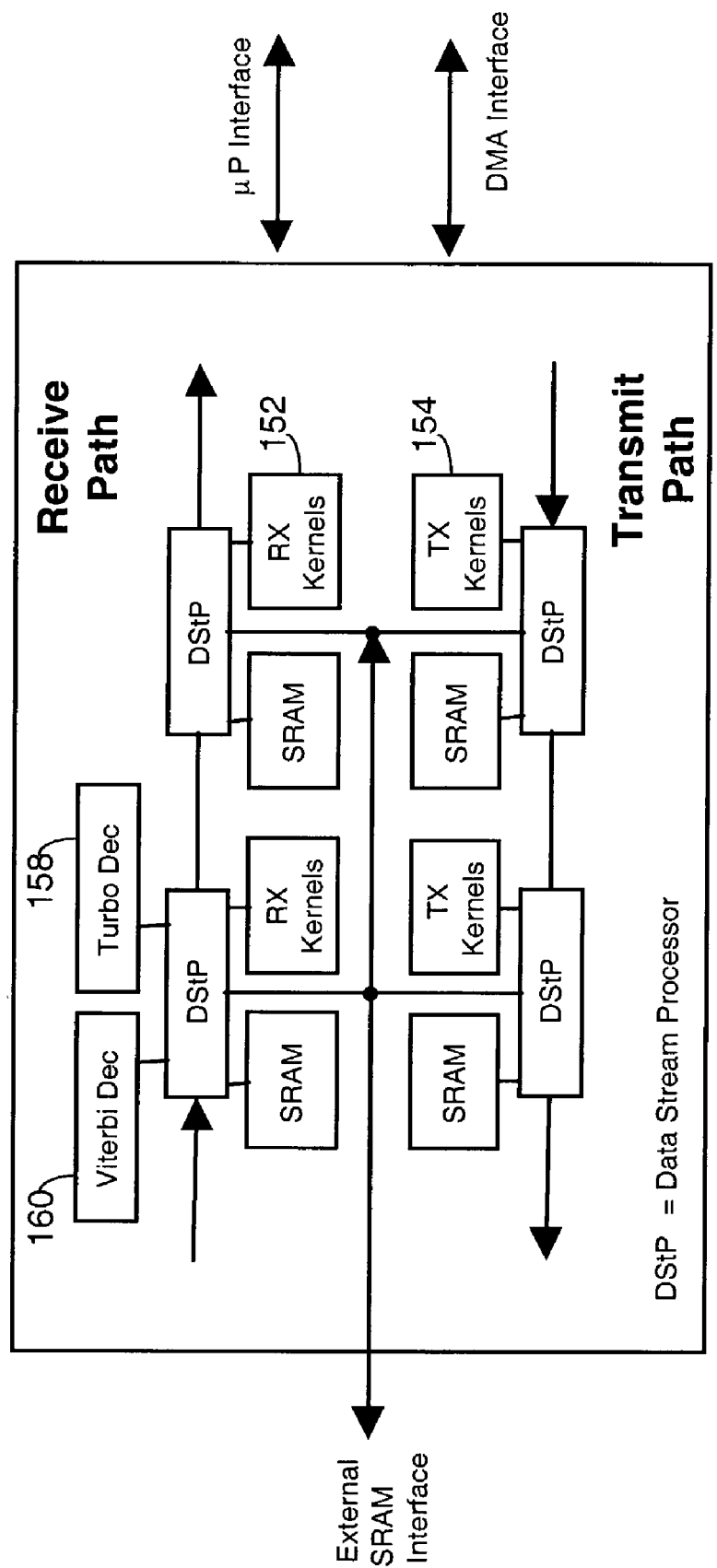
FIG. 7 illustrates an exemplary channel codec block architecture in accordance with an embodiment of the invention.

The CTE 100 can include a channel codec 116 which consists of proprietary data stream processors (DStPs™) 150 shown in FIG. 7 and associated accelerators and co-processors. It can be used to implement a wide variety of DS-SS applications. The channel codec 116 includes the following: RX Kernels 152 (de-interleaving, de-puncturing, rate-matching, CRC, segmentation, etc.) and TX Kernels 154 (Interleaving, puncturing, rate-matching, segmentation, convolutional encoding, Turbo encoding, CRC, IL address generation, and DMA control).

The key features of the Channel codec are as follows: DStPs 150 allow flexible and powerful data management and control; DMA interface 156 for data transfer to and from channel codec memory; and hardware accelerators allow data rates up to 12 Mbps.

The DStPs 150 can be used to build data-streams to process a complete chain of processing described by the user in the software. For example, a single data-stream could be de-interleaving, Turbo decoding, and CRC detection. The DStPs 150 have the following set of hardware kernels associated with them: turbo decoder 158; Viterbi decoder 160; convolutional encoder; turbo encoder; block/CRC encoder; rate matching; interleaver/de-interleaver; and bit separation/concatenation.

The channel codec 116 also includes a turbo decoder which includes the following key features: user selectable Log-MAP or Max-MAP algorithm; proprietary quantization schemes provide results within 0.1 dB of floating point implementation; adaptive decoding algorithm achieves desired SNR with minimum number of required iterations. Reduces number of iterations up to 60%; and seamless interface supports user defined stopping criterion algorithm.

The inputs for the channel codec 116 turbo decoder 158 include a channel codec memory.

The outputs for the channel codec 116 turbo decoder 158 include a channel codec memory.

The external program parameters for the channel codec 116 turbo decoder 158 include: code rate ($3/4$, $1/2$, $1/3$, $1/4$); generator polynomial ; maximum number of iterations (1–16); log-MAP or Max-Log-MAP; sliding window size (24 to 64); stopping criteria for adaptive decoding algorithm; and turbo interleaving pattern.

The internal program parameters for the channel codec 116 include the DStP software.

The CTE 100 channel codec 116 also includes a Viterbi decoder 160.

The inputs and outputs for the CTE 100 Channel codec 116 Viterbi decoder 160 include a channel codec memory.

The external program parameters for the Viterbi decoder 160 include: code rate ($1/6$–$1/2$); generator polynomials; path metric initial value; limit value for path metric max/min difference interrupt; depuncturing pattern; depuncturing algorithm; traceback method; traceback block length; trellis end state number; trace-open block length for estimation of start state; and trace-final block length for decoded data generation.

The internal program parameters for the Viterbi decoder 160 include the DStP 150 software.

Also included in the channel codec 116 is a convolutional encoder the inputs and outputs of which include the channel codec memory.

The external program parameters of the convolutional encoder comprise code rate ($1/6$–$1/2$); generator polynomials; and start state.

The internal program parameters of the convolutional encoder include the DStP 150 software.

The channel codec 116 also includes a turbo encoder. The inputs and outputs of the turbo encoder include channel codec memory.

The external program parameters of the channel codec 116 turbo encoder include: code rate; generator polynomials; start state; turbo interleaver method; and interleaver table.

The internal program parameters include the DStP 150 software.

The Block/CRC Encoder included in the channel codec 116 have inputs and outputs that include the channel codec memory.

The external program parameters for the block/CRC encoder include the following: block length; polynomial; and start state.

The internal program parameters include the DStP 150 software.

The rate matching unit included in the channel codec 116 has inputs and outputs that include the Channel codec memory.

The external program parameters for the rate matching unit include: block length; rate matching method; initial values; increment values; and decrement value.

The internal program parameters for the rate matching unit include the DStP 150 software.

The CTE 100 has a transmitter unit 112 which can accommodate a wide range of DS-SS applications.

The transmitter unit 112 is configured to realize various downlink channels. The transmitter performs the following: frame builder; time-slot and frame building; data mapping; maps bits to symbols for the required modulation (BPSK, QPSK); code modulation; and channelization and scrambling operation including O-QPSK modulation for IS2000.

The CTE transmitter 112 supports the following: discontinuous transmission; and compressed mode.

The inputs for the CTE transmitter 112 include the following: channel encoder output; parameter estimation processor output (uplink TPC bits); timing information from timing and control block; TFCI bits from codec; and FBI bits from modem.

The outputs for the CTE transmitter 112 include chip-rate data for TX pulse shaping filter.

The external program parameter includes channel type; slot format; weights for combining multiple physical channels; and CGU.

The CTE 100 has a timing and control unit 114 which can accommodate a wide range of DS-SS applications. The following description provides functions and interfaces for 3GPP and IS2000 as examples.

The timing control unit is designed for controlling overall CTE operation. It operates on the clock that is conditioned by the receive reference multipath. The unit directly interfaces with and controls the operation timing of demodulation finger/CGU, searcher finger/CGU, cell searcher, transmitter unit, power control unit and channel codec. Its main features are as follows: frame counters and frame boundary indicators; type A; radio frame for 3GPP FDD; radio frame for IS2000-1X; type B; slot for 3GPP FDD; power control group for IS2000-1X; global chip counters; reference timing adjustment for both TX and RX; action time event generation; symbol location indicators for data symbol extraction (e.g. TPC bits in downlink); and clock control for analog front-end including ADC and DAC.

Different CTE processing blocks can be configured to provide measurements. Main measurements that are provided by the CTE for an exemplary DS-SS application are:

The scan chain is also used to configure the CTE. The parameters used to setup CTE via this interface are referred to as Configuration Parameters.

The analog front-end control signals 152 are shown in FIG. 1(b). They include the transmitter power control (parameter estimation processor output); the receiver AGC output (front-end processing output); the AFC output (parameter estimation processor output); the DC offset correction control (front-end processing output); and the RSSI input (front-end processing input).

Other interfaces include the input clock; the output clock to drive RX ADC; and output clock to drive TX DAC.

| Measurement | CTE Block | Definition |
| --- | --- | --- |
| RSCP | Searcher | Searcher Received Signal Code Power, the received power on one code channel |
| SIR | Parameter estimation processor | Signal to Interference Ratio |
| Transmit Time | Transmitter | Transmission timing of UL channel Required for: Tm, SFN-CFN observed time difference, UE RX-TX time difference |
| Offset | Searcher Finger Processing Unit | Offsets of all detected paths (searcher) and offset of paths that are used in the demodulated data (Finger) Required for UE RX-TX time difference type-1 and 2, SFN-SFN observed time difference type-1 and 2 |
| Cell Frame start | MF-Searcher Searcher | Required for SFN-SFN observed time difference |
| CRC Indication | Decoder | Required for: Transport Channel BLER |
| Frame Number (SFN) | Decoder | Can be used to calculate the frame number offset between neighboring cells (OFF) |
| $E^b/I_0$ Finger | Finger Processing Unit | SNR per bit |

The CTE 100 communicates with the rest of the system via certain hardware interfaces. These hardware interfaces can be used in a wide range of DS-SS applications. These hardware interfaces include the receiver input. The receiver input interface includes a 16 bit wide input, 8 bits for each I and Q. If two antennas are used, the data from the two antennas is multiplexed on this bus. This input is fed to the decimation filter. The decimation filter decimates the data to 2fc, and stores it to the receiver input buffer.

The receiver input buffer memory interface provides coupling to the main receive buffer which is not part of the CTE core. The receive buffer is used to store decimated base-band data.

The transmitter output is fed to the transmitter pulse shaping filter and DAC.

The channel codec memory interface is used for channel codec memory buffers.

The memory buffers are used for input, output, interleaver, and deinterleaver data.

The parameter estimation processor memory interface allows the user to scale the instruction and data memory as needed by the specific parameter estimation algorithms for a particular product. The memory interface includes a data bus and an instruction bus for the μDSP.

The micro-processor interface processing resources are assigned and programmed by the CTE VMI software via this interface.

Figure 8:
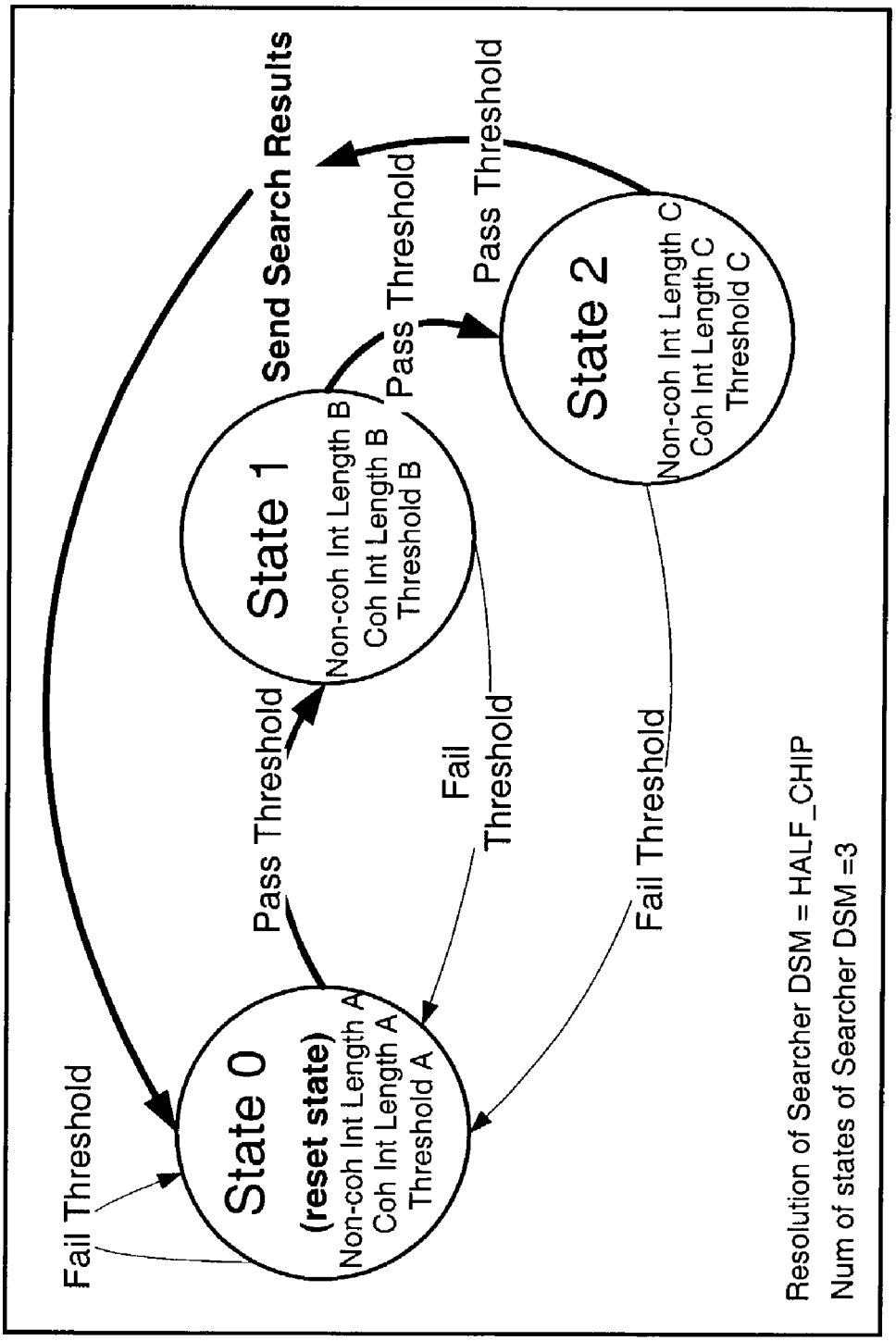
FIG. 8 is a 3 state DSM in accordance with an embodiment of the invention.

FIG. 8 illustrates a three state dwell state machine (DSM) which represents an exemplary embodiment of the operation of the searchers. If threshold A in state 0 is satisfied, the operation passes to state 1. If threshold B is satisfied in state 1, operation passes to state 2. If threshold C in state 2 is satisfied, the search results are sent to a typical search management unit. Should any threshold, whether A, B or C, fail, then operation is reset to state 0.

Figure 9:
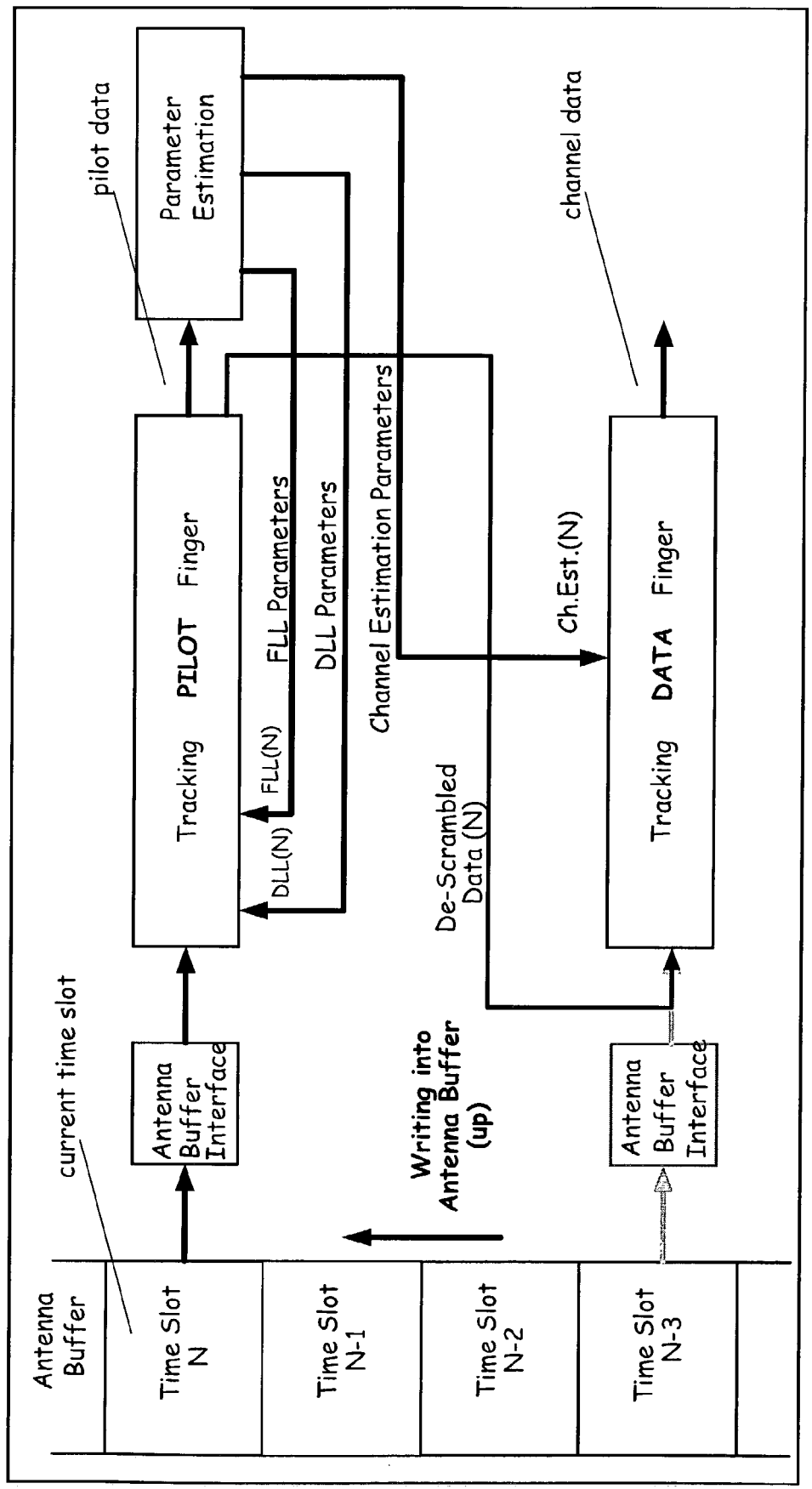
FIG. 9 is a causal channel estimation in accordance with an embodiment of the invention.
Figure 10:
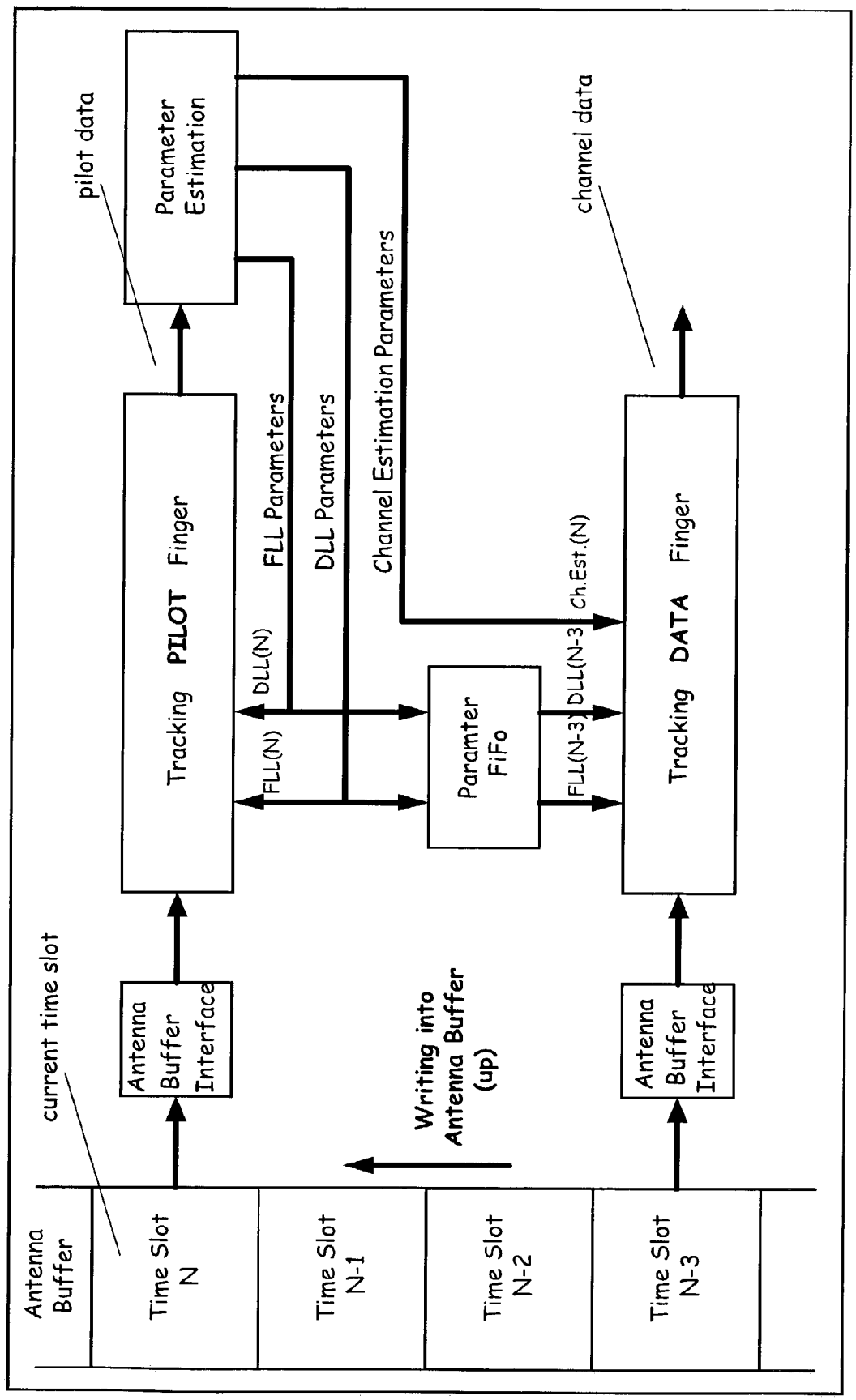
FIG. 10 is a non-causal channel estimation: chip level buffering in accordance with an embodiment of the invention.
Figure 11:
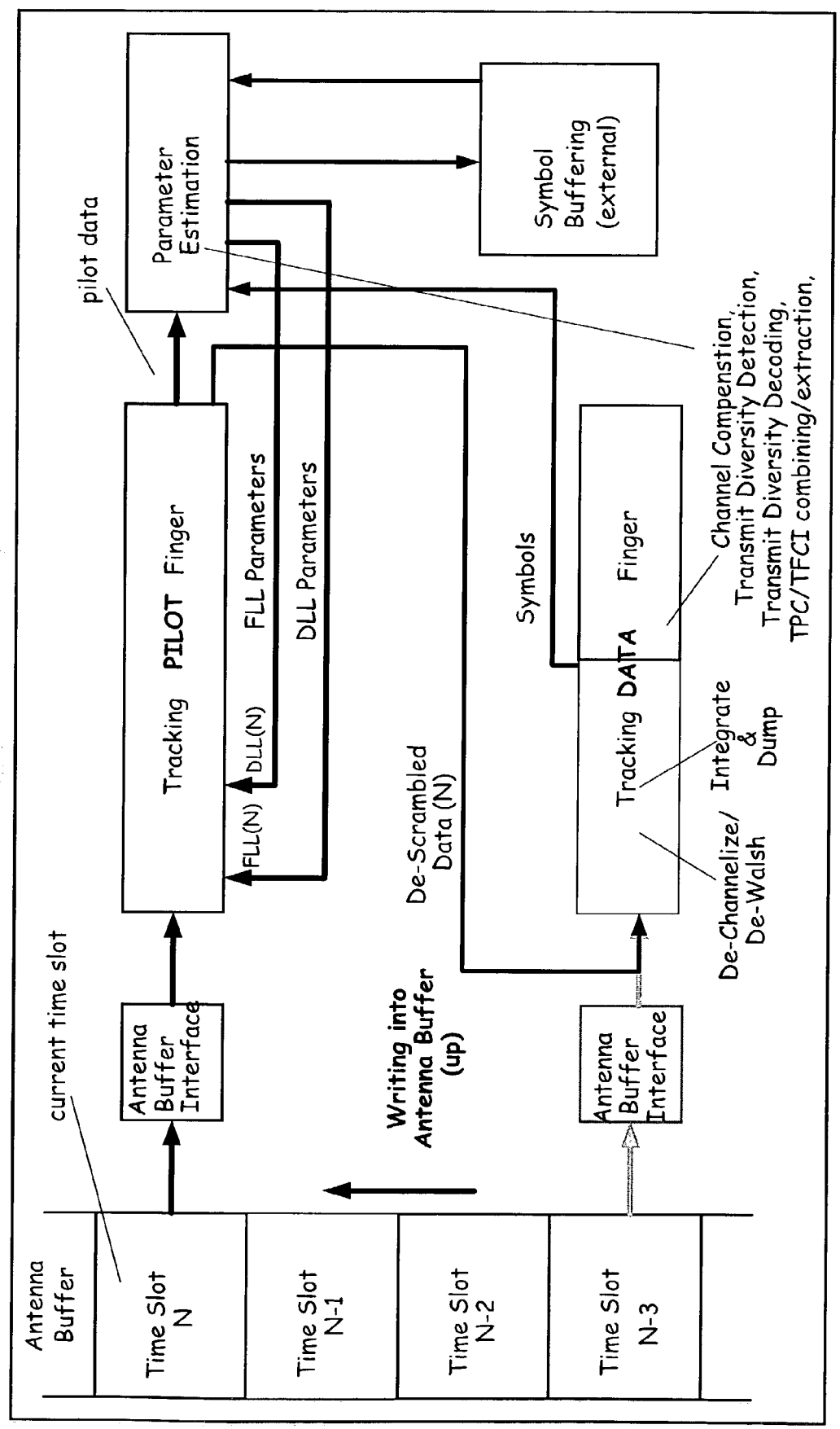
FIG. 11 is a non-causal channel estimation: symbol level buffering in accordance with an embodiment of the invention.

FIG. 9 illustrates the operation of the finger processing unit 108 in a causal channel estimation mode. The operation of the finger processing unit 108 in a non-causal channel estimation: chip level buffering mode is shown in FIG. 10. A non-causal channel estimation symbol level buffering mode of operation of the finger processing unit 108 is illustrated in FIG. 11.

Figure 13:
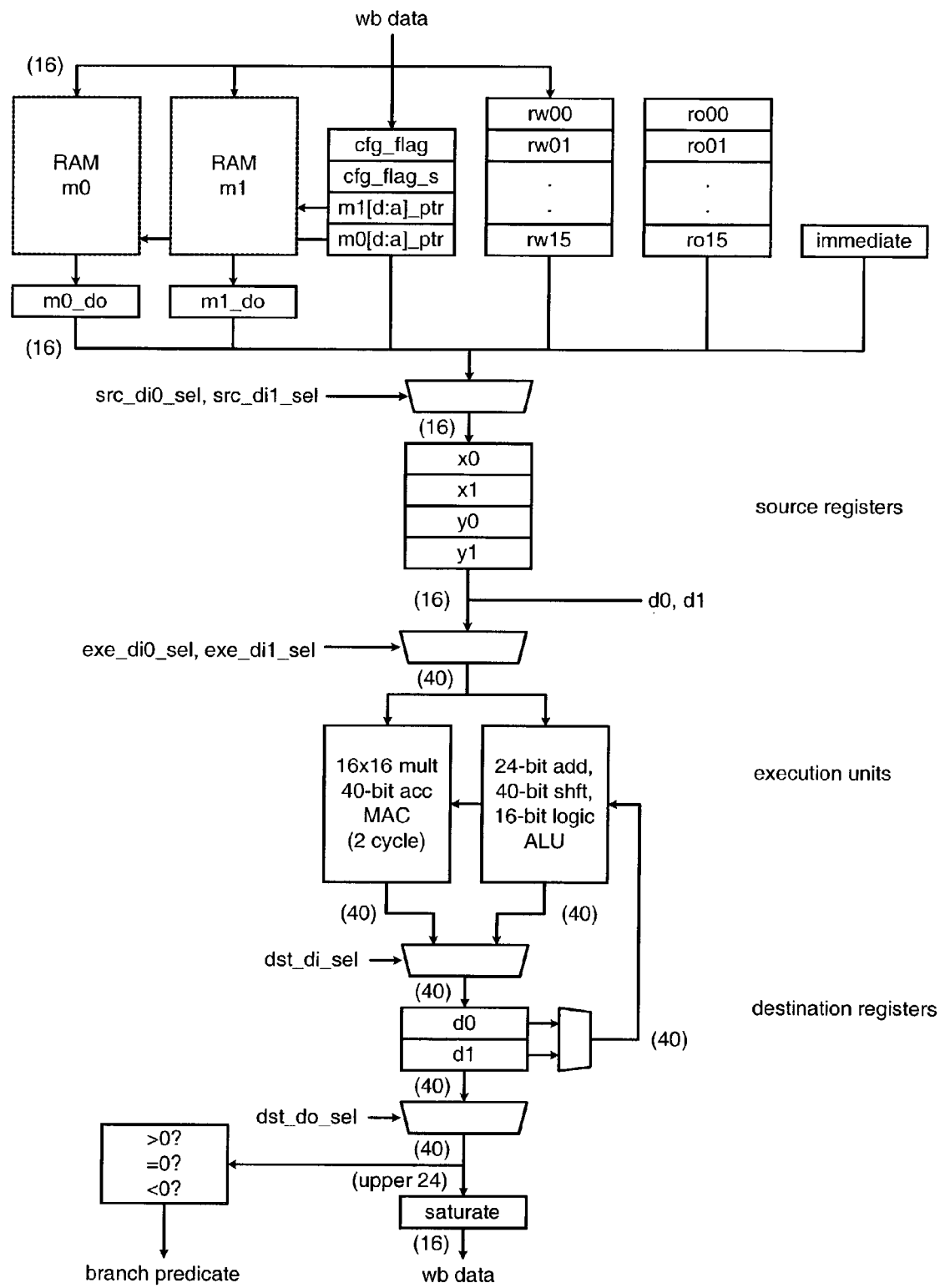
FIG. 13 illustrates an exemplary microDSP architecture in accordance with an embodiment of the invention.

An exemplary embodiment of the μDSP 146 architecture is shown in FIG. 13.

Figure 14:
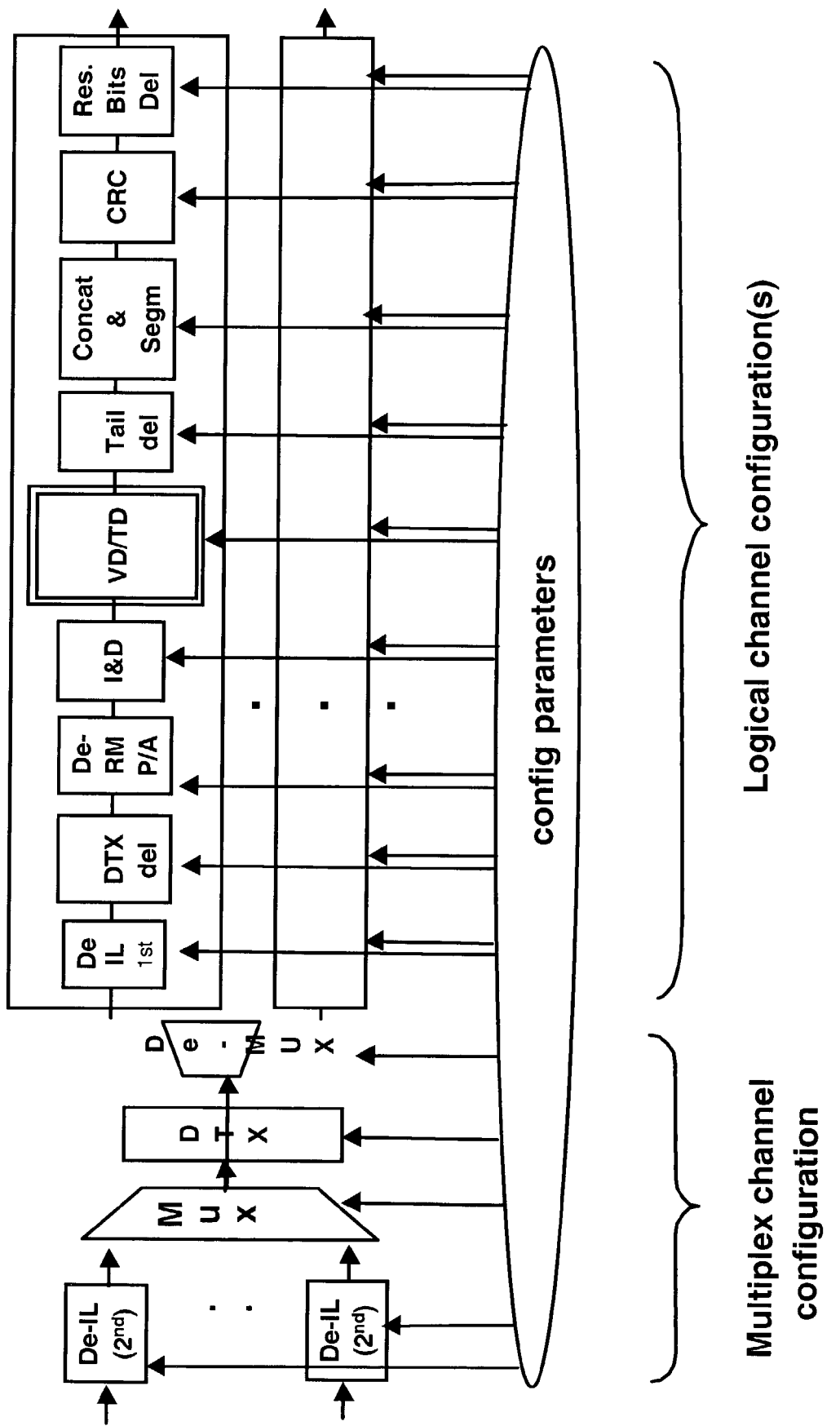
FIG. 14 illustrates an exemplary reconfigurable decoder-downlink in accordance with an embodiment of the invention which can be configured in 3GPP and IS2000 configurations.
Figure 15:
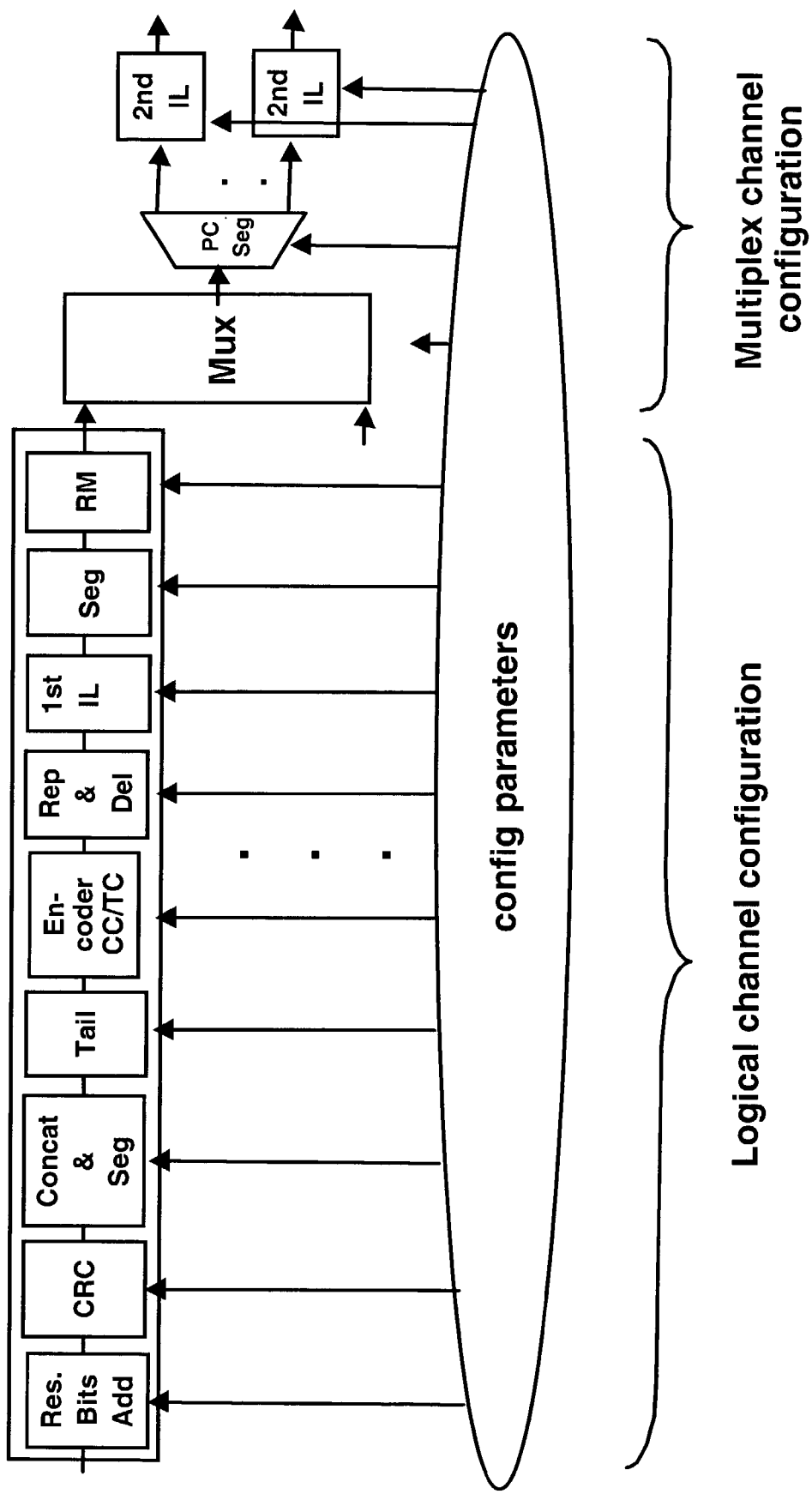
FIG. 15 illustrates an exemplary reconfigurable encoder-uplink in accordance with an embodiment of the invention which can be reconfigured in 3GPP and IS2000 configurations.

In FIG. 14, there is illustrated a reconfigurable decoder (downlink). In FIG. 15, a reconfigurable encoder (uplink) is illustrated. By appropriate selection of the configuration parameter in FIGS. 14 and 15, the user can modify the decoder and encoder for various standards such as 3GPP and IS2000.

While the present invention has been described and illustrated herein with respect to the preferred embodiments, it should be apparent that various modifications, adaptations and variations may be made utilizing the teachings of the present disclosure without departing from the scope of the invention and are intended to be within the scope of the present invention.

The invention claimed is:

1. Apparatus comprising:
   a first multiplier, having first and second inputs and an output;
   second and third multipliers, each having first and second inputs and an output, the first input of the second and third multipliers being connected to the output of the first multiplier;
   fourth and fifth multipliers, each having first and second inputs and an output, the first input of the fourth and fifth multipliers being connected to the output of the second multiplier;
   a multiplexer having two inputs and one output, one input being connected to the output of the fifth multiplier and the other input being connected to the output of the third multiplier;
   first and second integrators, each having an input and an output, the input of the first integrator being connected to the output of the fourth multiplier and the input of the second integrator being connected to the output of the multiplexer.

2. The apparatus of claim 1 further comprising a sixth multiplier having first and second inputs and an output, the output being connected to the first input of the first multiplier.

3. The apparatus of claim 2 further comprising:
   a buffer connected to the outputs of the first and second integrators,
   seventh and eighth multipliers each having first and second inputs and an output, the first inputs of the multipliers being connected to outputs of the buffer; and
   third and fourth integrators, each having an input and an output, the inputs of the third and fourth integrators being connected to the outputs of the seventh and eighth multipliers.

4. The apparatus of claim 1 wherein the second input to the first multiplier is a code useful in descrambling a sequence applied to the first input to the first multiplier.

5. The apparatus of claim 4 wherein the code is a pseudonoise code.

6. The apparatus of claim 1 wherein the second inputs to the second and third multipliers are codes useful in dechannelizing signals applied to the first inputs to the second and third multiplexers.

7. The apparatus of claim 6 wherein the codes are Walsh codes.

8. Apparatus comprising a modem unit and a channel codec unit, said modem unit having:
   a front end unit for coupling to an antenna;
   a matched filter searchers unit coupled at least to the front end unit;
   a searchers unit coupled to at least the front end unit;
   a finger processing unit coupled to the front end unit;
   a parameter estimation processor unit coupled to at least the finger processing unit and the searchers unit;
   a combiner coupled to the finger processing unit and the parameter estimation processor unit; and
   a transmitter unit coupled to the parameter estimation processor unit;
said channel codec unit having:
   a channel decoder unit coupled at least to the finger processing unit via the combiner; and
   a channel encoder coupled at least to the transmitter unit.

9. The apparatus of claim 8 wherein the parameter estimation processor unit controls and serves as a core to coordinate information from both transmit and receive signal processing chains.

10. Apparatus comprising a modem unit and a channel codec unit, said modem unit having:
    a front end unit for coupling to a signal source;
    a matched filter searchers unit coupled at least to the front end unit, said matched filter searchers unit configured to provide time slot synchronization;
    a searchers unit coupled to at least the front end unit, said searchers unit configured to provide frame synchronization and identification of code groups and identification of codes;
    a finger processing unit coupled to the front end unit;
    a parameter estimation processor unit coupled to at least the finger processing unit and the searchers unit; and
    a transmitter unit;
said channel codec unit having:
    a channel decoder unit coupled at least to the finger processing unit; and
    a channel encoder coupled at least to the transmitter unit.

11. Apparatus of claim 10 wherein said finger processing unit comprises a pilot finger unit and a data finger unit.

12. Apparatus of claim 10 wherein said matched filter searchers unit comprises:
    a first multiplier, having first and second inputs and an output;
    second and third multipliers, each having first and second inputs and an output, the first input of the second and third multipliers being connected to the output of the first multiplier;
    fourth and fifth multipliers, each having first and second inputs and an output, the first input of the fourth and fifth multipliers being connected to the output of the second multiplier;
    a multiplexer having two inputs and one output, one input being connected to the output of the fifth multiplier and the other input being connected to the output of the third multiplier;
    first and second integrators, each having an input and an output, the input of the first integrator being connected to the output of the fourth multiplier and the input of the second integrator being connected to the output of the multiplexer.

13. The apparatus of claim 12 further comprising a sixth multiplier having first and second inputs and an output, the output being connected to the first input of the first multiplier.

14. The apparatus of claim 13 further comprising:
    a buffer connected to the outputs of the first and second integrators,
    seventh and eighth multipliers each having first and second inputs and an output, the first inputs of the multipliers being connected to outputs of the buffer; and
    third and fourth integrators, each having an input and an output, the inputs of the third and fourth integrators being connected to the outputs of the seventh and eighth multipliers.

15. The apparatus of claim 12 wherein the second input to the first multiplier is a code useful in descrambling a sequence applied to the first input to the first multiplier.

16. The apparatus of claim 15 wherein the code is a pseudonoise code.

17. The apparatus of claim 12 wherein the second inputs to the second and third multipliers are codes useful in dechannelizing signals applied to the first inputs to the second and third multiplexers.

18. The apparatus of claim 17 wherein the codes are Walsh codes.

19. Apparatus comprising on a chipset a modem unit and a channel codec unit, said modem unit having:
   a front end unit for coupling to an antenna;
   a matched filter searchers unit coupled at least to the front end unit said matched filter searchers unit configured to provide time slot synchronization;
   a searchers unit coupled to at least the front end unit said searchers unit configured to provide frame synchronization and identification of code groups and identification of codes;
   a finger processing unit coupled to the front end unit said finger processing unit comprising a pilot finger unit and a data finger unit;
   a parameter estimation processor unit coupled to at least the finger processing unit and the searchers unit; and
   a transmitter unit;
said channel codec unit having:
   a channel decoder unit coupled at least to the finger processing unit; and
   a channel encoder coupled at least to the transmitter unit.

* * * * *

UNITED STATES PATENT AND TRADEMARK OFFICE
CERTIFICATE OF CORRECTION

PATENT NO. : 7,139,305 B2
APPLICATION NO. : 10/212190
DATED : November 21, 2006
INVENTOR(S) : Stratis Gavnoudias et al.

Page 1 of 1

It is certified that error appears in the above-identified patent and that said Letters Patent is hereby corrected as shown below:

In the Specification:

At column 9, line 1, "MN-Searcher" should read --MF-Searcher--

Signed and Sealed this

Thirtieth Day of January, 2007

JON W. DUDAS
*Director of the United States Patent and Trademark Office*